United States Patent [19]

Novak

[11] Patent Number: 5,021,903

[45] Date of Patent: Jun. 4, 1991

[54] MAGNETIC TAPE CARTRIDGE

[75] Inventor: Warren D. Novak, Chappaqua, N.Y.

[73] Assignee: Rank Video Services America, Northbrook, Ill.

[21] Appl. No.: 475,409

[22] Filed: Feb. 5, 1990

Related U.S. Application Data

[62] Division of Ser. No. 211,545, Jun. 24, 1988, Pat. No. 4,920,436.

[51] Int. Cl.$^5$ .............................................. G11B 15/66
[52] U.S. Cl. ...................................... 360/96.1; 360/93; 360/95; 360/132; 242/199
[58] Field of Search ............................ 360/93, 94–95, 360/85, 132, 134, 96.1; 242/195, 198–200

[56]  References Cited

U.S. PATENT DOCUMENTS

| | | | |
|---|---|---|---|
| 2,468,993 | 5/1949 | Moomaw | 352/160 |
| 3,674,942 | 7/1972 | Sugaya et al. | 242/199 X |
| 3,677,497 | 7/1972 | Lowry et al. | 242/199 |
| 3,764,757 | 10/1973 | Inaga | 242/55.19 X |
| 3,783,200 | 1/1974 | Jantzen et al. | 360/85 |
| 3,797,036 | 3/1974 | Eibensteiner | 360/85 |
| 3,800,314 | 3/1974 | Sato | 360/85 |
| 3,831,198 | 8/1974 | Kihara et al. | 360/85 |
| 3,955,779 | 5/1976 | Bielik | 242/199 |
| 4,196,873 | 4/1980 | Kudoh | 242/195 |
| 4,249,710 | 2/1981 | Dobbs et al. | 242/199 |
| 4,426,047 | 1/1984 | Richard et al. | 242/197 |
| 4,492,351 | 1/1985 | Zöellner | 242/197 |
| 4,526,330 | 7/1985 | Shimizu | 242/199 |
| 4,558,384 | 12/1985 | Umeda | 360/94 |

Primary Examiner—John H. Wolff
Attorney, Agent, or Firm—Benoit Law Corporation

[57] ABSTRACT

A magnetic tape cartridge is adapted for use in a magnetic tape cassette in lieu of a tape supply reel, such cassette also having a takeup reel for use of that cassette, after reception of the cartridge therein, in apparatus designed to receive magnetic tape in a two-reel-type cassette for transducing magnetic signals relative thereto. A single reel for the tape is in the cartridge, and a tape coupling device is on the magnetic tape at the cartridge for connection of the magnetic tape from the cartridge to the takeup reel. A coupling is on the cassette for interconnection of the magnetic tape from the cartridge via the coupling device to the takeup reel upon insertion of the cartridge loaded with the magnetic tape into the cassette in lieu of a tape supply reel.

20 Claims, 10 Drawing Sheets

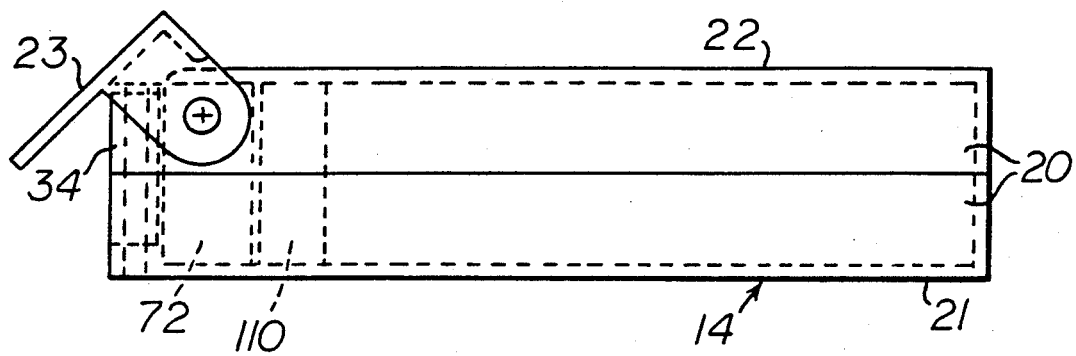
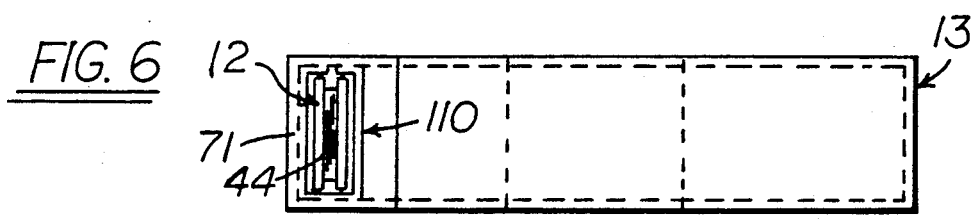
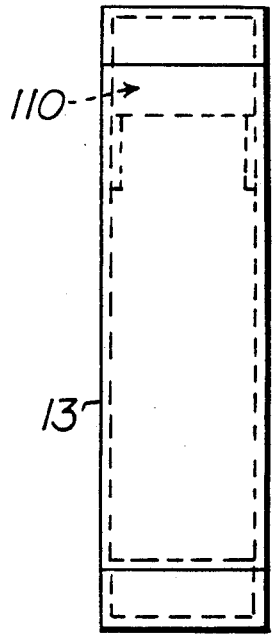
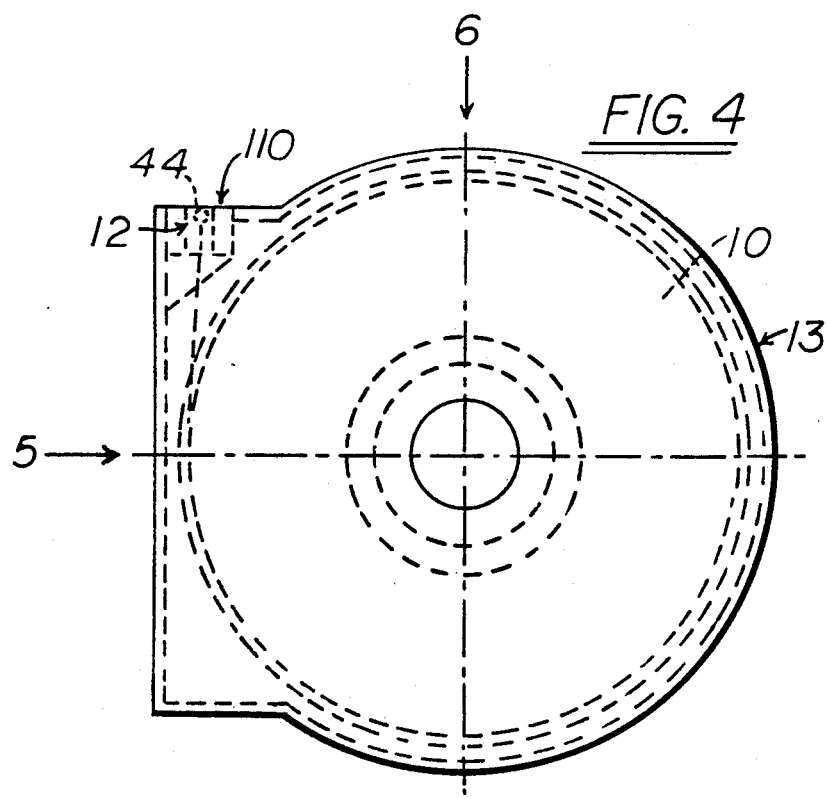

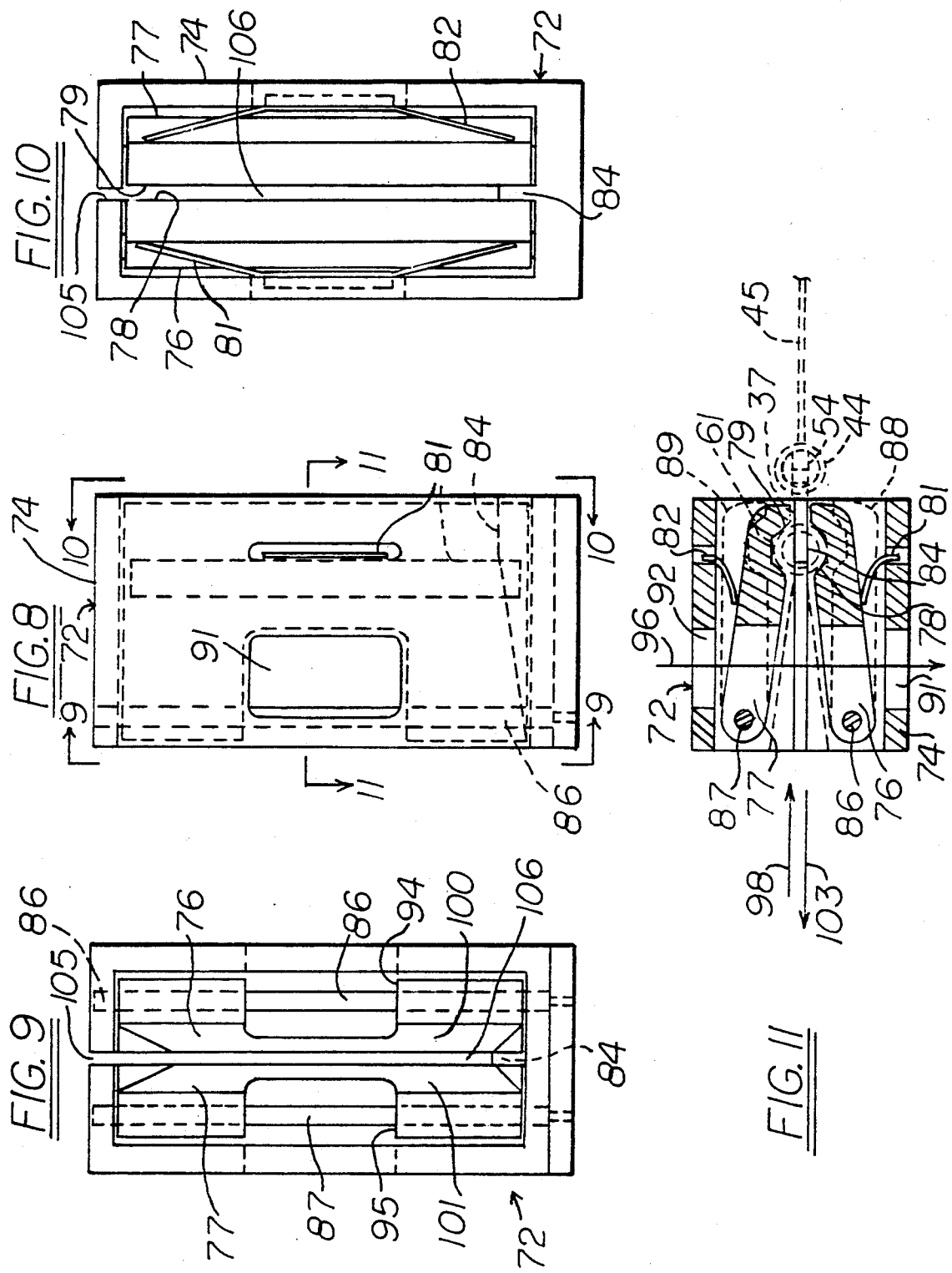

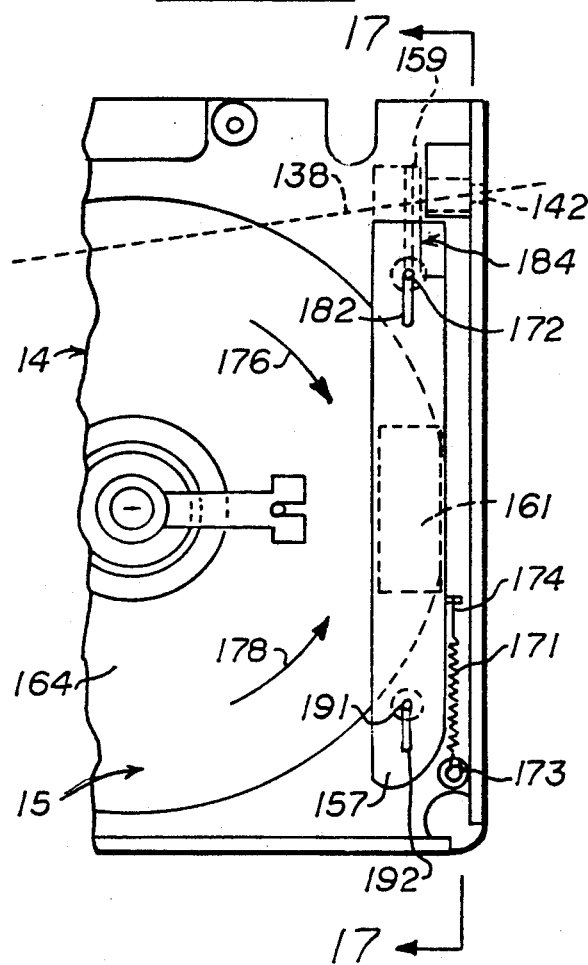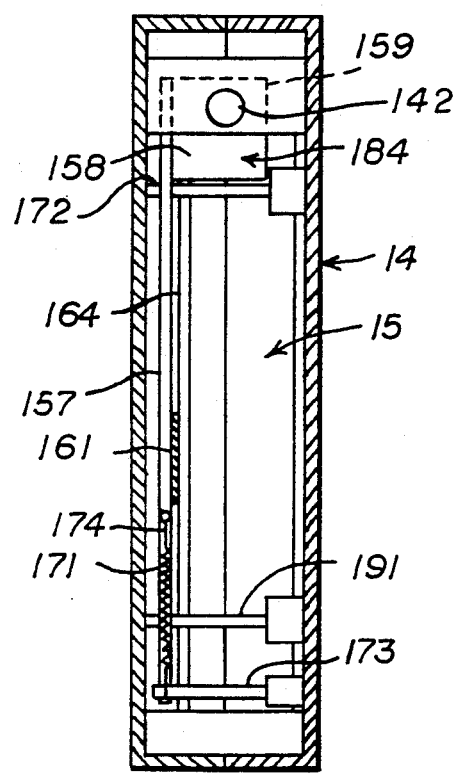

MAGNETIC TAPE CARTRIDGE

BACKGROUND OF THE INVENTION

CROSS-REFERENCE TO PARENT APPLICATION

This is a Division of application 07/211,545 filed June 24, 1988, now U.S. Pat. No. 4,920,436 for magnetic Tape Cassette System, by Warren D. Novak, assigned to Rank Video Services America.

FIELD OF THE INVENTION

The subject invention relates to video and other tape cassette systems, recorders and playback methods and apparatus, and to magnetic tape cassettes and to cartridges usable in such cassettes.

INFORMATION DISCLOSURE STATEMENT

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitations in a preamble serve the purpose of providing antecedents for the remainder of a statement of invention or claim.

German Patent Publication No. 28 45 238, for "Sound Film Recorder With Drive," by Ottmar-Paul Haberkern, published 30 Apr. 1980, suggested that a film cassette capable of being swung open would have the advantage that the amateur could insert into the cassette his self-made films or any purchased film title, and, after having closed the cassette shut, could display the program at the push of a button. In that manner, that German patent publication points out, the amateur needs to purchase the cassette only once, thereby being able to purchase film audiovisual programs with his savings.

That German patent publication contemplates that the film be inserted and removed while on a reel, mentions a conical fitting to clasp the cassette lid in a closed position, and shows the cassette lid hinged to opposite sides of the cassette casing.

U.S. Pat. No. 3,955,779, by P. G. Bielik, issued May 11, 1976 for Cartridge with Removable Take-up Sub-cartridge, requires the use of base film that is stiff enough that it can be made to travel through a threading path by pushing it from the supply side toward the take-up side. This would not work with any of the audio or video tape on the market today, which is only 0.001 inch or about 25 micron thick, and thereby too flimsy to push even half an inch or even one centimeter. Furthermore, the system is not bi-directional; that is, the film moves only from the supply side to the take-up side. Once it is cut by the built-in knife, it cannot be threaded back toward the supply side.

U.S. Pat. No. 4,249,710, by Dobbs et al, issued Feb. 10, 1981 for Reloadable Cassette discloses a clam-shell type of cassette from which magnetic tape reels may be removed and which may be reloaded with new magnetic tape reels. One disadvantage of that approach is that the user has to handle two reels and that the tape is exposed to extensive damage and contamination through handling during tape removal and reloading.

The above mentioned German patent application does not suggest how such damage and contamination could be avoided. Especially in the case of video tapes, it is very important that handling of the tape by the user be avoided, and conventional video tape cassettes for that purpose have a normally locked hinged front cover, which prevents touching of the tape and which is only opened by special mechanism in the video tape recorder or playback apparatus.

U.S. Pat. No. 4,492,351, by R. Zoellner, issued Jan. 8, 1985 for Housing for Tape Cassette, relates to a container or housing for receiving a small mini-tape cassette consisting of at least two moveable half sections and adopting it for use in a larger recording/playback apparatus, whereby the sections are separated and the tape brought into the pickup position for the larger apparatus in a relatively automatic manner.

U.S. Pat. No. 4,558,384, by H. Umeda, issued Adapter Means, relates to the VHS-C cassette system developed by its assignee. The primary purpose of that system, like that of the above mentioned Zoellner patent, is to allow video tape in a small cassette to be recorded on in miniaturized equipment and then played back in a standard recorder using an adaptor. Since the small cassette is just as complicated and just as expensive as a standard cassette, savings of the type contemplated in the above mentioned German patent publication are not realized thereby.

U.S. Pat. No. 4,526,330, by T. Shimizu, issued July 2, 1985, for Tape Cassette Having Removable Reels, requires the user to handle one or more separate reels which are individually inserted into, and removed from, the cassette.

A pin-shaped engaging part on a leader of the tape supply has to be manually inserted into a takeup reel hub groove, with the leader or tape being inserted sideways into a slit or slits in the cassette frame or takeup reel.

U.S. Pat. No. 3,677,497, by Lowry et al, issued July 18, 1972, for Tape Cartridge Mechanism for Computer, discloses a cartridge having a stabilizer system for standard computer tape reels that may be placed in the cartridge for recording and that may subsequently be removed from the cartridge for use in a computer. The cartridge includes a cover which is joined to a base by a piano hinge that allows the case to be opened fully so that the top wall of the cover and the bottom wall of the base lie in the same or parallel planes.

Forerunners, as well as prototypes, of present-day video tape recorders may, for instance, be seen from U.S. Pat. Nos. 3,674,942, by Sugaya et al, issued July 4, 1972 for magnetic recording and reproducing apparatus with a two-reel-type cassette, having tape supply and takeup reels arranged side by side or concentrically, U.S. Pat. No. 3,764,757, by Katsu Inaga, issued Oct. 9, 1973 for magnetic recording and reproducing apparatus with tape guide and pick-up system for use with a tape cartridge or cassettes having tape supply and takeup reels arranged concentrically, U.S. Pat. No. 3,797,036, by Walter Eibensteiner, issued Mar. 12, 1974 for recording and playback apparatus and two-reel-type cartridge having tape supply and takeup reels arranged side by side or concentrically, U.S. Pat. No. 3,800,314, by Seiji Sato, issued Mar. 26, 1974 for recording and reproducing apparatus and cartridge with concentrically arranged tape supply and takeup reels, and U.S. Pat. No 3,831,198, by Kihara et al, issued Aug. 20, 1974 for magnetic recording and reproducing apparatus with a two-reel-type cassette.

Reference may also be had to VCR manuals, such as the SONY SERVICE MANUAL, for the VO-1600 VCR, published 1972 by Sony Corporation.

In a different vein, U.S. Pat. No. 2,468,993, by L. H. Moomaw, issued May 3, 1949 for a motion picture projector, discloses a mechanism for maintaining a fire shutter out of the projection light path by frictional forces exerted on fingers as long as the projector gear advances the motion picture film.

SUMMARY OF THE INVENTION

It is a general object of this invention to provide an improved magnetic tape cartridge for use in a magnetic tape cassette in lieu of a tape supply reel.

Other objects will become apparent in the further course of this disclosure.

From one aspect thereof, the invention resides in a method of providing magnetic tape for use in standardized apparatus designed to receive tape of that kind in a two-reel-type cassette for transducing signals relative to the tape. The invention according to this aspect resides, more specifically, in the improvement comprising in combination the steps of providing the magnetic tape with a first tape coupling device, loading the magnetic tape and first tape coupling device into a one-reel cartridge, providing the cassette with a takeup reel, providing the takeup reel in the cassette with a second tape coupling device interconnectable with the first tape coupling device, adapting the first and second tape coupling devices for automatic interconnection upon insertion of the loaded cartridge into the cassette, and providing the cassette with space for receiving the loaded cartridge in lieu of a tape supply reel and for said automatic interconnection of the first and second tape coupling devices upon insertion of the loaded cartridge into said cassette space.

From a related aspect thereof, the invention resides in a magnetic tape cassette adapted for use in apparatus designed to receive magnetic tape in a two-reel-type cassette for transducing signals relative to the tape, and, more specifically, resides in the improvement comprising, in combination, a first tape coupling device for the magnetic tape, a one-reel-type cartridge for such magnetic tape and first tape coupling device, a takeup reel in the cassette, a second tape coupling device in the cassette connected to the takeup reel and adapted to interconnect with the first tape coupling device automatically upon insertion of the cartridge loaded with the tape into the cassette, and means for providing a space in the cassette for receiving the cartridge in lieu of a tape supply reel and for effecting said automatic interconnection of the first and second tape coupling devices upon insertion of the cartridge loaded with the magnetic tape into said space in the cassette.

From a related aspect thereof, the invention resides also in a magnetic tape cassette adapted for use in apparatus designed to receive magnetic tape in a two-reel-type cassette for transducing signals relative to the tape and, more specifically, resides in the improvement comprising, in combination, means for providing a space in the cassette for receiving a one-reel-type cartridge for the magnetic tape and a first tape coupling device for that magnetic tape, a takeup reel in the cassette, a second tape coupling device in the cassette connected to the takeup reel and adapted to interconnect with the first tape coupling device automatically upon insertion of the cartridge loaded with the tape into the casette, and means for effecting said automatic interconnection of the first and second tape coupling devices upon insertion of the cartridge loaded with the tape into said space in the cassette.

From a further related aspect thereof, the invention resides in a magnetic tape cartridge adapted for use in a magnetic tape cassette, in lieu of a tape supply reel, such cassette also having a space into which the cartridge may be inserted and from which it may be removed, a takeup reel for use of that cassette, after reception of said cartridge in that space, in apparatus designed to receive magnetic tape in a two-reel-type cassette for transducing signals relative thereto. The cassette contains a tape coupling device connected to the takeup reel and having a pin member at the space for the cartridge in the cassette. The invention according to this aspect resides in the improvement comprising, in combination, a single reel for magnetic tape in the cartridge, magnetic tape on the single reel in the cartridge and means interconnection of the magnetic tape from the cartridge via the tape coupling device to the takeup reel upon insertion of the cartridge loaded with the magnetic tape into the cassette in lieu of a tape supply reel including a tubular tape coupling member having a bore adapted to releasably receive the pin member and having a tubular wall encompassing that bore .

According to preferred embodiments of the invention, the tape coupling device includes means for rendering the interconnection disconnectable for removal of the magnetic tape and tape coupling device with the cartridge from the cassette, and for automatically restoring the interconnection upon insertion of the cartridge loaded with the magnetic tape and the tape coupling device into the cassette.

The expression "magnetic tape" is herein used as a word of art intended to be broad enough to cover information recording tapes and also tapes on which information has been prerecorded. Especially "prerecorded video tape" has become very popular for purchase or rental and playback in a video tape recorder (VCR) or playback apparatus, for display of the prerecorded features on a television or other video display set. However, the utility of the subject invention is not limited to video, with or without sound accompaniments, but extends to music and other audio, including digital audio recordings in slant tracks, and to computer programs and other data recorded on tape.

From a further aspect thereof, the invention resides in an interconnection of a first tape with a second tape, comprising, in combination, a first joint permitting angular movement of the first tape relative to a remainder of the interconnection about a first axis, a second joint permitting angular movement of the second tape relative to a further remainder of the interconnection about a second axis parallel to the first axis, a stabilizing member between the first and second joints, and means for rendering the interconnection disconnectable along the first axis extending through the first joint.

According to an embodiment of this aspect of the invention, the defined means for rendering the interconnection disconnectable include means for automatically restoring the interconnection upon relative movement of the tapes toward each other along the defined axis.

Other aspects of the invention will become apparent in the further course of this disclosure, and no restriction is intended by this summary of the invention.

BRIEF DESCRIpTION OF THE DRAWINGS

The subject invention and its various objects and aspects will become more readily apparent from the following detailed description of preferred embodiments thereof, illustrated by way of example in the accompanying drawings, in which like reference numerals designate like or equivalent parts, and in which:

FIG. 3 is a view, on an enlarged scale, taken on the line 3—3 in FIG. 2;

FIG. 4 is another top view of a cartridge according to a preferred embodiment of the subject invention;

FIG. 5 is a view of the cartridge, as seen in the direction of the arrow 5 in FIG. 4;

FIG. 6 is a view of the cartridge, as seen in the direction of the arrow 6 in FIG. 4;

FIG. 8 is a side view, on an enlarged scale, of a cassette-side tape coupling trap mechanism broadly indicated at the arrow 8 in FIG. 2;

FIG. 9 is a front view of the trap mechanism as seen in the direction of the arrow 9 in FIG. 8;

FIG. 10 is a rear view of the trap mechanism as seen in the direction of the arrow 10 in FIG. 8;

FIG. 11 is a section, on an enlarged scale, taken on the line 11—11 in FIG. 8, and a dotted outline of a tape interconnection and a coupling device trapped in that illustrated mechanism;

FIG. 16 is a detail view similar to a detail of FIG. 15, but showing a rewind sensor according to another embodiment of the invention;

FIG. 17 is a view taken on the line 17—17 in FIG. 16;

DESCRIPTION OF PREFERRED EMBODIMENTS

Figure 1:
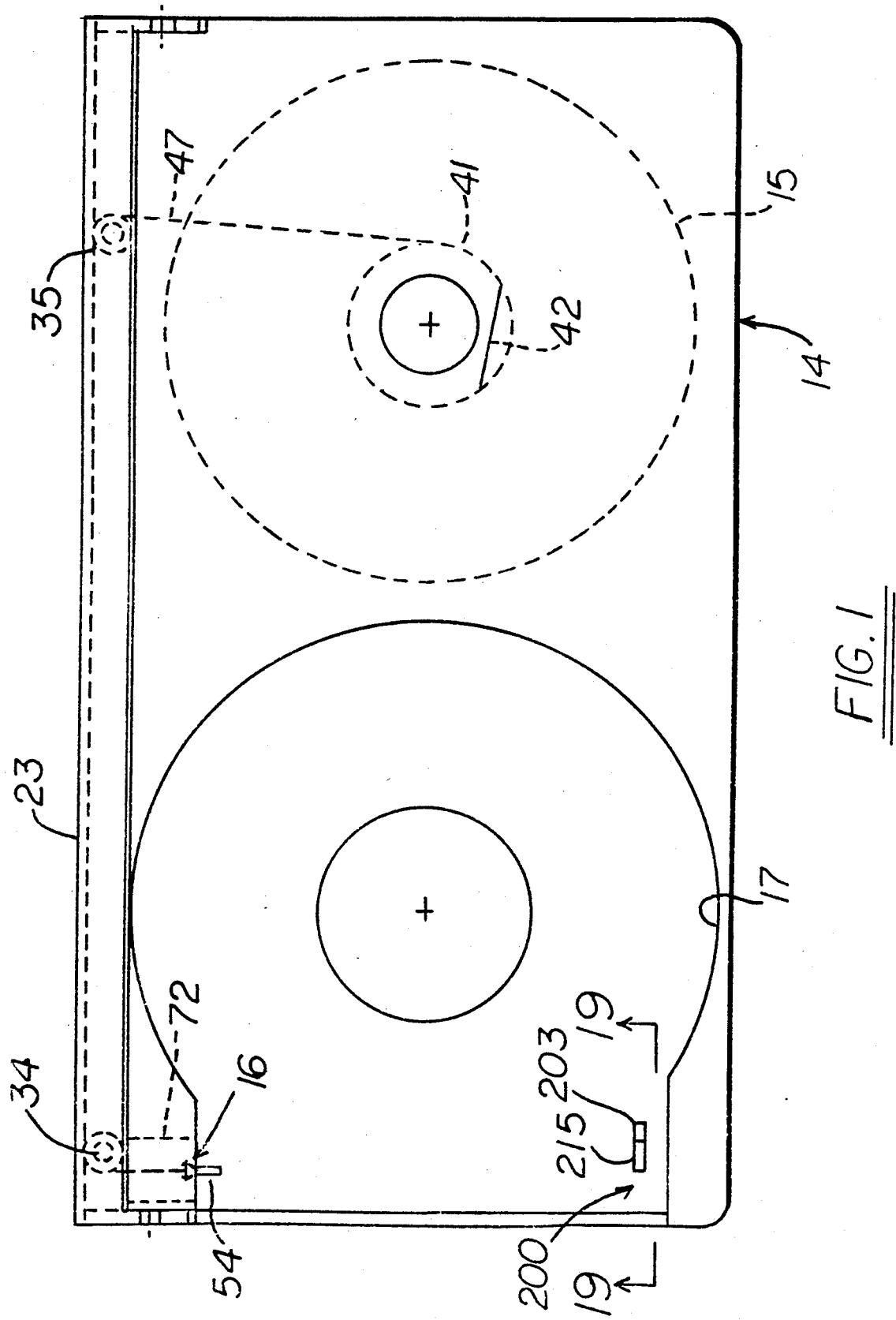
FIG. 1 is a top view of a cassette according to a preferred embodiment of the subject invention.

Most of the embodiments of the invention herein disclosed relate to a method of providing video tape for use in apparatus designed to receive tape of that kind in a two-reel-type cassette for transducing video signals relative thereto. The apparatus to which the invention thus mostly addresses itself have come to be known throughout the world as video cassette recorders (VCR). It is a special feature of the subject invention, that preferred embodiments thereof are usable in standard video cassette recorders without any modification of the recorder, its playback apparatus or its operation being necessary.

The utility of the subject invention is not limited to video tapes, cassettes and recorders but may extend to other areas, as already mentioned above.

The illustrated preferred embodiment provides the video tape 10 with a first tape coupling device 12. The video tape 10 and first tape coupling device 12 are loaded into a one-reel-type cartridge 13. The cassette 14, on the other hand, is provided with a takeup reel 15. That takeup reel in the cassette 14 is provided with a second tape coupling device 16 interconnectable with the first tape coupling device 12.

According to the invention, the cassette 14 is provided with a space 17 for receiving the loaded cartridge 13 in lieu of the traditional tape supply reel and for interconnection of the first and second tape coupling devices 12 and 16 upon insertion of the loaded cartridge into the cassette space.

As seen in FIG. 3, the cassette 14 has a cassette case 20 made of two casing halves; namely, a cassette bottom half 21 and a cassette top half 22. These cassette halves preferably are permanently interconnected and they or the cassette are structured so that the cartridge 13 is insertable into the cassette space 17, and is removable from that space.

Figure 2:
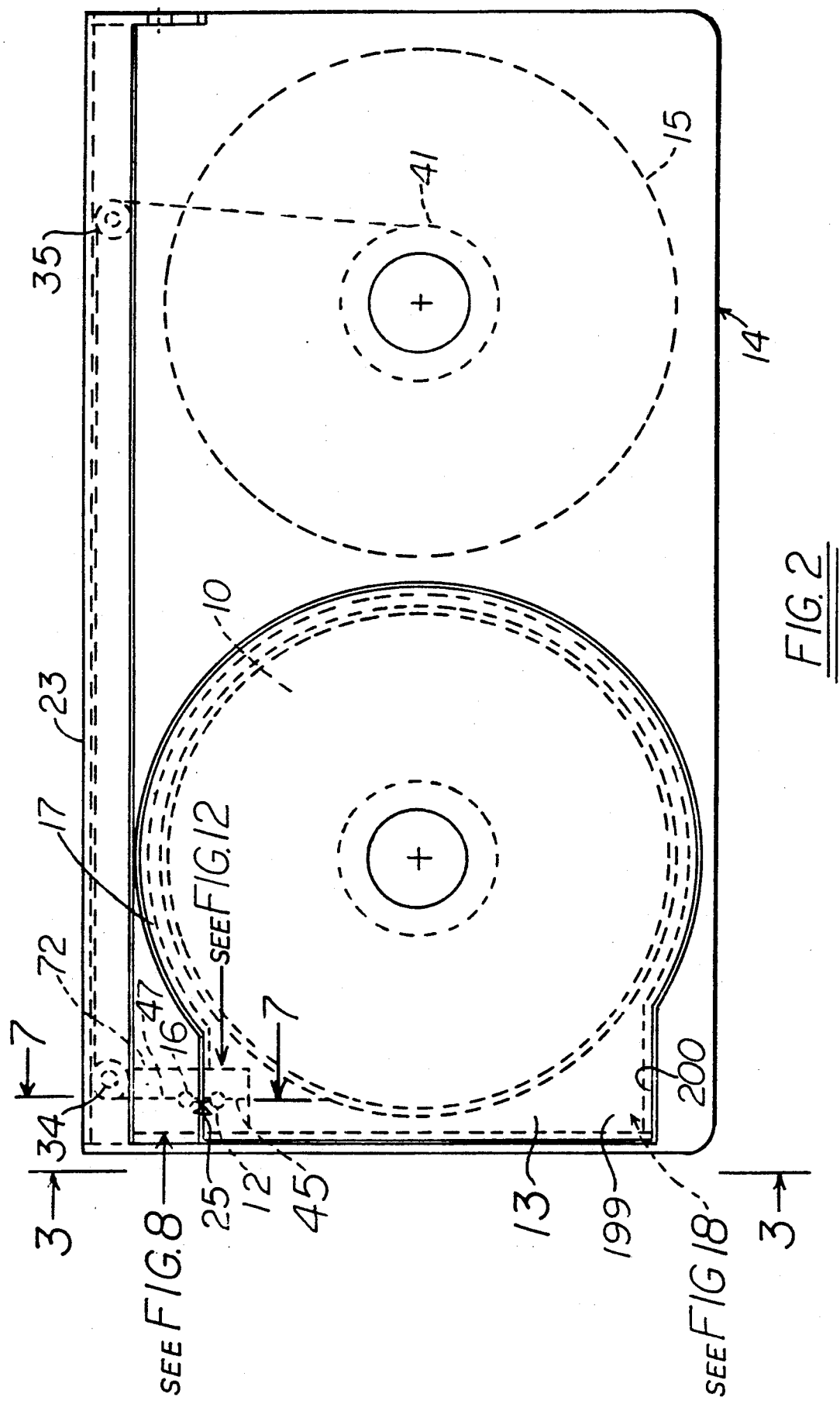
FIG. 2 is a view similar to FIG. 1 and a top view of a cartridge inserted into that cassette in accordance with a preferred embodiment of the subject invention.

The traditional hinged tape cover 23 conventionally provided to prevent manual contact with, or damage to, the video tape and generally hinged with its pivot between the top and bottom halves of the cassette, may in fact be hinged on the top half 22 of the cassette casing 20. FIGS. 1 and 2 show that tape cover 23 in its normal quiescent tape protective position, while FIG. 3 shows that hinged tape cover in the process of being pushed upwardly in a VCR preparatory to removal of the tape from the cassette 14 for recording or playback purposes.

According to an important feature of the subject invention, the interconnection 25 of the first and second tape coupling devices 12 and 16 is made automatically upon insertion of the loaded cartridge 13 into the cassette space 17. Conversely, the illustrated embodiment of the invention renders the interconnection 25 disconnectable for removal of the video tape 10 and first tape coupling device 12 with the cartridge 13 from the cassette. Like their interconnection upon insertion of the cartridge into the cassette, the disconnection of the tape coupling devices 12 and 16 from each other also is automatic upon removal of the cartridge 13 from the cassette 14. In this respect, the means for rendering the interconnection 25 disconnectable may include means for automatically restoring that interconnection upon insertion of the cartridge 13 loaded with the video tape 10 and the first tape coupling device 12 into the cassette space.

According to a preferred embodiment of the invention, the interconnection 25 is disconnectable and is reconnectable in a direction lying in a plane of the video tape or of any tape leaders. In practice, this can be accomplished as specifically disclosed hereinafter. Alternatively, it would, for instance, be possible within the scope of the subject invention to move one coupling device toward the other coupling device in a direction of tape travel for interconnection of these two devices. That kind of interconnection within the scope of the subject invention would be more in the manner of an automatic coupling as practiced in the field of rail transportation, which, however, are uncoupled manually in reality.

Figure 7:
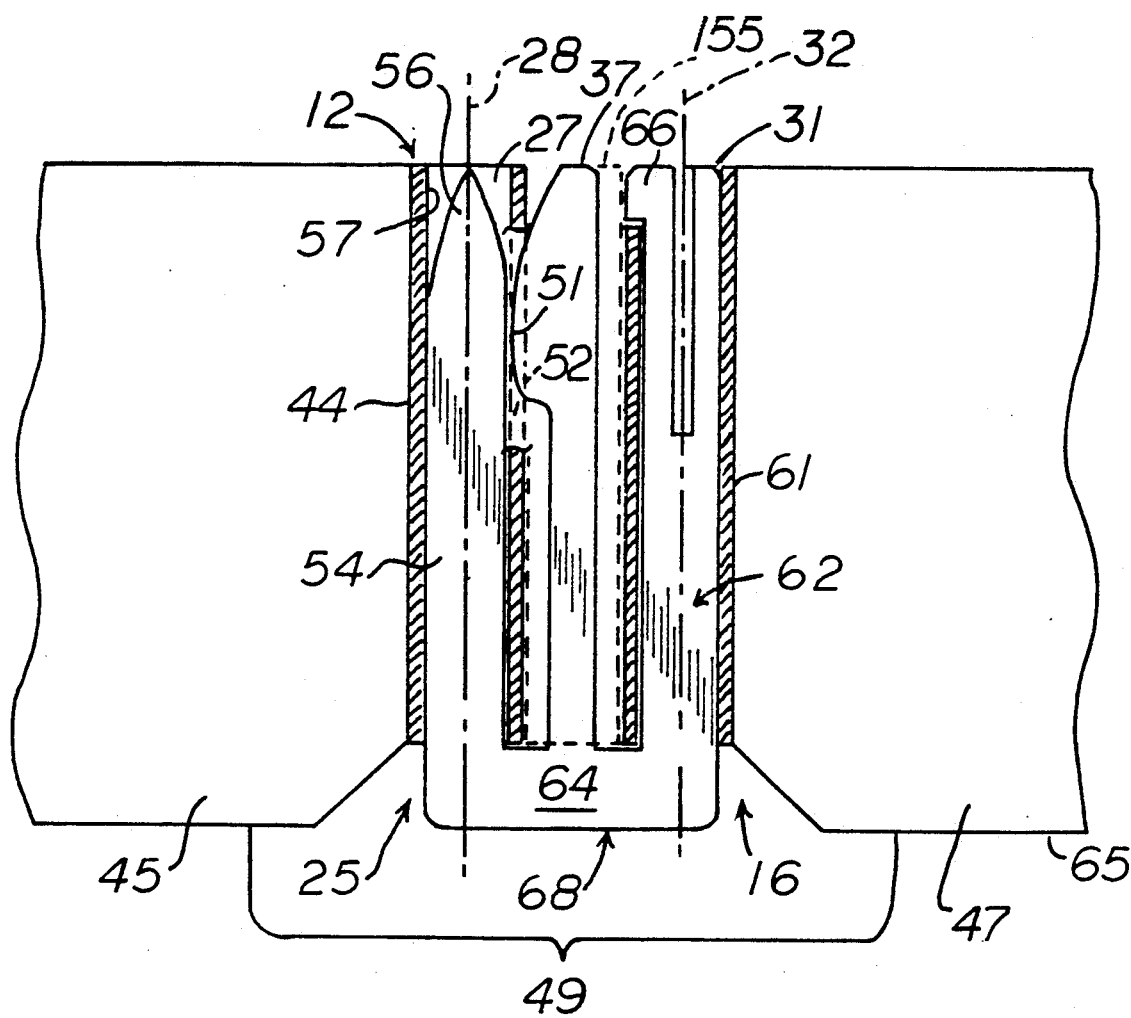
FIG. 7 is a view, on an enlarged scale of a tape junction according to a preferred embodiment of the invention, as seen on the line 7—7 in FIG. 2.
Figure 12:
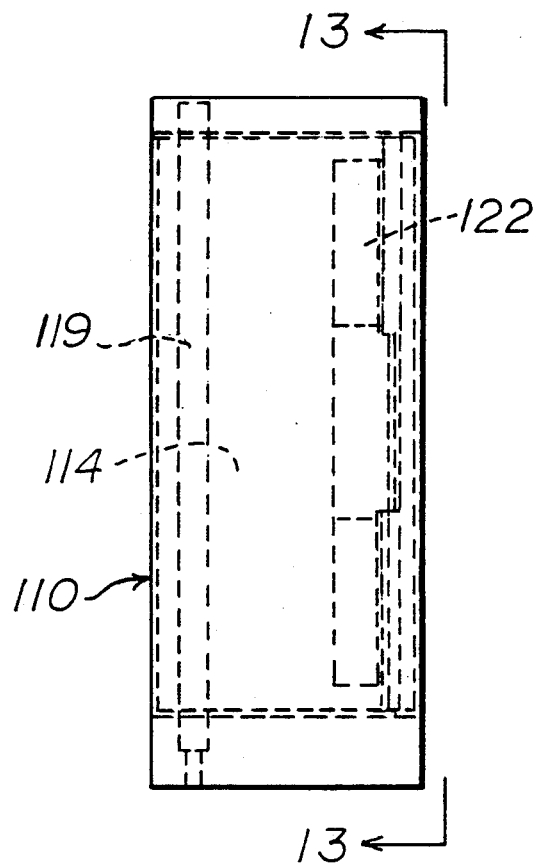
FIG. 12 is a side view, on an enlarged scale, of a cartridge-side tape coupling trap mechanism as employed at 12 in the cartridge shown in FIG. 2.
Figure 13:
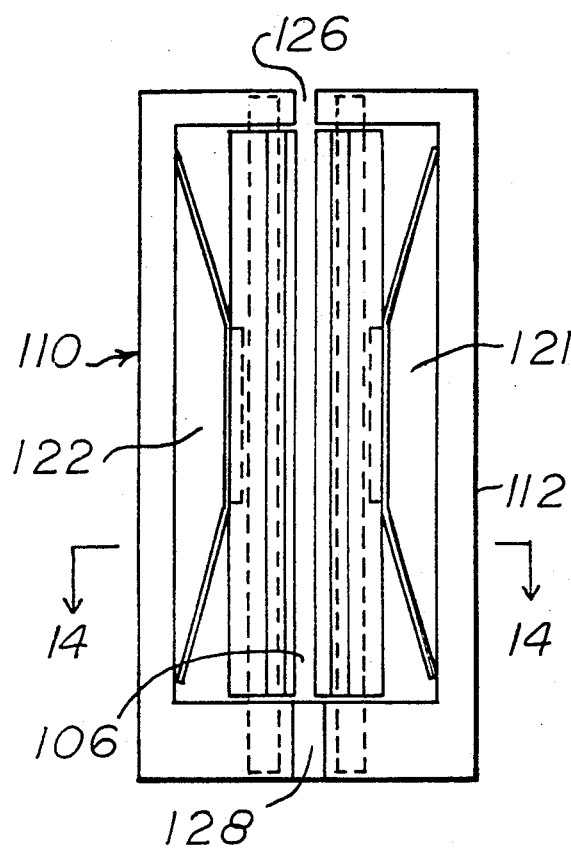
FIG. 13 is a front view of the trap mechanism as seen in the direction of the arrow 13 in FIG. 12.

The preferred embodiment of the subject invention, however, provides a tape coupling approach of the type illustrated in FIG. 7. Of course, the coupling concept even within that preferred approach is broader than the particular showing of FIG. 7 or of other illustrations in the accompanying drawings. Broadly speaking, the invention provides first and second tape coupling devices 12 and 16 adapted for automatic interconnection upon insertion of the loaded cartridge 13 into the cassette 14 or cassette opening or space 17.

For instance, the aspect of the invention embodied in the arrangement of FIG. 7 provides the interconnection 25 with an articulate joint 27 permitting relative angular movement of the first and second tape coupling devices 12 and 16. In the specifically illustrated embodiment, the interconnection is provided with a first joint 27 permitting angular movement of the video tape relative to that interconnection 25 about a first axis 28, and with a second joint 31 permitting angular movement of the second tape coupling device 16 relative to the interconnection 25 about a second axis 32 parallel to the first axis.

In practice, that kind of articulation can be very important, such as in the case of a cassette design requiring advancement of tape and tape leaders peripherally over relatively small tape guides 34 and 35, such as shown in FIGS. 1 and 2. A stiff interconnection of tape coupling devices could impair, if not disrupt, the tape advance and could even damage the tape guides. Damaged guides could damage the tape in turn or could otherwise affect proper recording of video signals on the tape or proper playback of video signals from the tape.

A currently discussed aspect of the invention elegantly avoids such problems by making the joint or interconnection articulate in at least one and preferably two places 28 and 32.

The preferred embodiment of the invention shown in FIG. 7 provides the interconnection 25 with a stabilizing member 37 between the first and second joints 27 and 31 or first and second axes 28 and 32. As apparent in the further course of this disclosure, that stabilizing member 37 preferably is releasably retained during insertion of the cartridge into the cassette and during removal of that cartridge 13 from the cassette 14. As also apparent in the further course of this disclosure, the stabilizing member 37 or an equivalent thereof may serve to releasably retain the interconnection 25 against disconnection by force of gravity. That term is herein broadly employed to refer not only to the gravitational field of the earth, but also to vibrational effects which tend to loosen the joint 27 or disconnect the tape coupling members 12 and 16 from each other, particularly in the stretch between the tape guides 34 and 35 and even between the cartridge 13 and the guide 34 or the guide 35 and the takeup reel 15.

An embodiment of the subject invention combines the takeup reel and the first and second tape coupling devices 12 and 16 to provide a smooth cylindrical surface at a reel hub 41 for winding the video tape 10 from the cartridge 13 smoothly and continuously unto the takeup reel 15. As shown on the first drawing sheet, the takeup reel hub 41 may be provided with a flat or cord 42 for the purpose of accommodating the interconnection 25 when tape leaders and thereafter the tape 10 are wound on the takeup reel hub 41.

In principle, the tape 10 could be attached directly to a hollow member 44 of the first tape coupling device. However, provision of the first tape coupling device with a first tape leader 45 is generally preferred for increased strength and manageability. That first tape leader 45 is connected to the video tape 10 and is loaded into the one-reel-type cartridge 13.

The second tape coupling device 16 is provided with a second tape leader 47 connected to the takeup reel 15 or hub 41 and extending from that takeup reel or hub to the space 17 in the cassette.

In that case, the interconnection 25, takeup reel 15 and the first and second tape leaders 45 and 47 are combined, such as with the aid of a takeup reel hub flat 42, to provide a smooth cylindrical surface at the hub 41 for winding the video tape from the cartridge 13 smoothly and continuously onto the takeup reel.

The preferred embodiment shown in the drawings, or an equivalent thereof, renders the interconnection 25 disconnectable in a plane having the first and second tape leaders 45 and 47 extending therethrough, for removal of the video tape 10 and first tape leader 45 with the cartridge 13 from the cassette 14.

The preferred embodiment of the subject invention forms from the first and second tape leaders 45 and 47, upon insertion of the loaded cartridge 13 into the cassette 14, an overall tape leader 49 for the video tape 10, extending from inside the loaded cartridge 13 to the takeup reel 15 or reel hub 41 in the cassette 14. Pursuant to the illustrated preferred embodiment of the invention, the interconnection 25 and the resulting formation of the first and second tape leaders into an overall tape leader 49 for the video tape are made automatically upon insertion of the loaded cartridge 13 into the cassette space 17.

The preferred embodiment of the invention also includes methods and means for releasably retaining the overall tape leader 49 against separation by force of gravity into distinct first and second tape leaders 45 and 47. Within the scope of the invention, there may be means and methods for releasably retaining the interconnection 25 against disconnection by force of gravity in any direction. This releasable retention is also effective when the interconnection 25 is moved between cartridge 13 and takeup reel 15.

In the preferred embodiment shown in FIG. 7, the stabilizing member 37 has a lateral projection 51 toward the first tape coupling device, for releasably retaining that first coupling device 12 against disconnection from the second tape coupling device 16 by force of gravity. In an effort to graphically illustrate that feature, part of the tubular member 44 of the first tape coupling device 12 is shown by dotted lines 52 in the vicinity of the projection 51. This, however, does not mean that the tubular member 44 actually need to have a window or depression through which the lateral projection 51 can enter. Indeed, it is within the scope of the illustrated embodiment that the lateral projection 51 of the stabilizing member presses against the outside surface of the tubular member 44 of the first tape coupling device 12 relatively lightly. At any rate, the tubular member 44 has a tubular wall encompassing the bore 57, as seen in the lower half of FIG. 7 in conjunction with FIGS. 2, 4, 11, and 14 showing circles for the tubular member 44.

The stabilizing member 37 is sufficiently resilient for an accommodation of the wall of the tubular member 44 at the projection 51, without impairment of the function of the articulate joint 27, especially during travel of the interconnection 25 over the tape guides 34 and 35, and also during its placement onto the takeup reel hub 41 at the flat 42.

Functional equivalents of the inadvertent tape separation preventing means shown in FIG. 7 would include other resilient devices, such as one which would enter the tubular member 44 and act on the inside thereof to prevent separation of the first and second tape coupling devices 12 and 16 by force of gravity as herein defined. These are, of course, just examples of what could be done, once the concept disclosed herein has become known. However, the embodiment illustrated in FIG. 7 actually constitutes the best mode currently contemplated for carrying the particular aspect of the invention into effect. It is preferred in this respect that the tape coupling devices be releasably retained within the interconnection 25 against disconnection by force of gravity.

What has been said above about the tape coupling devices 12 and 16 and interconnection 25 without reference to tape leaders also applies to the preferred embodiment which uses tape leaders 45 and 47 to form an overall tape leader 49 upon insertion of the loaded cartridge 13 into the cassette space 17.

In this respect, it may be briefly mentioned that the interconnection 25 has an articulate joint 27 permitting predetermined relative angular movement of the tape leaders 45 and 47 relative to each other.

According to the illustrated preferred embodiment of the invention, the interconnection 25 has a first joint 27 permitting angular movement of the first tape leader 45 relative to a remainder of that interconnection about a first axis 28, and that interconnection also has a second joint 31 permitting angular movement of the second tape leader 47 relative to a further remainder of the interconnection 25 about a second axis 32 parallel to the first axis.

Within a preferred embodiment of the subject invention, one of the coupling devices 12 and 16 has a projecting pin member 54 extending at right angles to a longitudinal edge of the video tape 10, at least when the first and second tape coupling devices 12 and 16 are interconnected. In the embodiment shown in FIG. 7, the pin member 54 is a prong having a longitudinal axis 28 extending at right angles to the longitudinal edges of the tape leaders 45 and 47.

The projecting pin member or prong has a free end 56, and the other of the tape coupling devices, such as the device 12, includes a bearing 44 having a bore 57 for releasably receiving the pin member or prong upon insertion of the loaded cartridge 13 into the corresponding cassette space 17.

A spring member is integral with the coupling deVice 68 for releasably retaining the pin member or prong 54 in the bore 57 against gravitational force. As already mentioned above, the stabilizing member or bar 37 may perform the function of that spring member with its lateral projection 51 extending toward, but being spaced from, the pin member 54, for reception and releasable retention of a wall portion 52 of the bearing 44 between that pin member 54 and spring member 37/51.

Means for connecting the pin member 54 and stabilizing bar 37 to the second tape leader 47 include a second bearing 61 connected to an end of that second tape leader and to a shaft member or prong 62 extending through and retained in the second bearing and connected to the stabilizing bar 37 and pin member 54.

The tape junction assembly shown in FIG. 7 includes a base member 64 extending in parallel to a longitudinal edge 65 of the second tape leader 47 when the tape junction is running in a straight line and having the first prong or pin member 54, the second prong or stabilizing bar 37 and the third prong 62 projecting perpendicularly therefrom.

That third prong 62 preferably is split, having a lateral projection 66 surpassing a wall section of the second bearing 61 for retention of that split prong in that second bearing before, during and after angular movement of the takeup reel tape leader 47 and shaft member 62 relative to each other about the transverse axis 32.

In practice, the first bearing 44 may be a steel tube termination of what may be considered the cartridge or feed reel tape leader 45, and the second bearing 61 may be a steel tube termination of what may be considered the takeup reel leader 47. Materials other than steel may, of course, be used for this termination, if adequate to the task.

The heart of the junction 25 shown in FIG. 7 will be recognized as an essentially E-shaped or trident coupling member 68 having one outer leg 62 journalled relative to the second tape leader 47, having another outer leg 54 journalled relative to the first tape leader 45, when the first and second tape leaders are interconnected, having a central leg 37 between the first and second outer legs, and having a back 64 carrying these three legs and extending in parallel to a longitudinal edge 65 of the second tape leader when running in a straight line.

For the tape junction 25 shown in FIG. 7, the tape leaders 45 and 47 are recessed at the bottom and the tape leader terminations 44 and 61 are correspondingly short thereat, so as to accommodate the base member 64 of the coupling 68, so that that coupling does not project downwardly from either tape leader. It may be noted in this respect that the lower edge of the coupling base member 64 is in line with the lower longitudinal edges of the tape leaders 45 and 47, including the previously mentioned longitudinal edge 65.

According to a preferred embodiment of the subject invention, the cassette 14 releasably retains the second coupling member 16 or second tape leader termination or bearing 61 near the cartridge space 17 as shown, for instance, in FIG. 1. By way of preferred example, the first trap mechanism 72 indicated or shown in FIGS. 1, 2 and 8 to 11 may be employed and may be mounted in the cassette outside of the cartridge space 17 for that purpose.

The first trap mechanism 72 operates outside of the cassette space 17 for the cartridge 13 for releasably trapping the second coupling device 16 or 61 at that space 17 preparatory to removal of the cartridge from that cassette space 17, during removal and absence of the cartridge from the cassette and preparatory to insertion of that cartridge 13 into that space 17 in the cassette 14.

The trap mechanism 72 has a frame 74 enclosing components thereof, including clamping arms 76 and 77 with jaws 78 and 79. The frame 74 and thereby the first trap mechanism 72 is mounted outside of the cartridge space 17 at the place where the tape removal and return opening of the cartridge will be located, when that or any like cartridge 13, etc., is inserted or present in that cartridge space 17.

Springs 81 and 82 bias the arms or jaws toward a short centerpiece 84 of the frame 74, for centering the second tape coupling device 16 or 61 between the spring-biased jaws 78 and 79. In the illustrated preferred embodiment, the part 84 is in the form of a triangular-shaped ramp for raising the tape junction and thereby the tape from the height at which it moves around the VCR to the height at which it enters the feed reel, since that feed reel in the cartridge 13 is operating at a higher level; having been mounted in the cartridge and having been raised up by the thickness of the cartridge floor and being maintained at this elevated position. That triangular-shaped ramp 84 centers the springloaded arms 76 and 77 so that they will accurately deliver the tape junction to the arms 113 and 114 of the trap mechanism 110 in the cartridge 13 shown in FIG. 4.

The enclosing frame 74 mounts pivot pins 86 and 87 for the clamping arms 76 and 77. The clamping arms or jaws are biased by means of springs 81 and 82, which in order to avoid confusion, are not shown in FIG. 9, and which are shown in their minimum compression condition in FIG. 11.

The frame 74 has windows 91 and 92 and the clamping arms 76 and 77 have corresponding recesses or openings 94 and 95 for permitting a photoelectric or equivalent sensing device in the VCR or other tape recording or playback apparatus to sense an advancement of the tape out of the cartridge and a return of that tape 10 into the cartridge, such as by means of a light beam 96 and a clear leader 47. End-of-tape may be sensed in this manner when rewind of tape 10 into the cartridge 13 has been completed.

The frame centerpiece 84 also forms a ramp for guiding the tape junction 25, including the coupling member 68, into the trap mechanism 72, such as during rewind of the tape 10 into the cartridge 13, indicated by FIG. 11 by an arrow 98.

In that case, the tape 10 and its tape leader 45, returning from the takeup reel 15 go first through the cassette-side trap mechanism 72, above the ramp and centerpiece 84, followed by the first tape coupling device 12 or first termination 44, coupling member 68, second coupling device 16 with its second termination 61 and tape leader 47. The first tape leader termination 44 thereby will impinge upon the inner sides 100 and 101 of the clamping arms 76 and 77 shown, for instance, in FIG. 9, thereby spreading the same apart against the bias of the springs 81 and 82, as indicated by dotted lines 88 and 89 in FIG. 11.

By the time the first termination 44 arrives at the jaws 78 and 79 (see FIG. 11), the second termination 61 has already reached, and has impinged upon, the inner sides 100 and 101 of the clamping arms 76 and 77, thereby keeping the same spread apart against the bias of the then bent springs 81 and 82. This is an important feature of the illustrated preferred embodiment of the invention, since it permits the front portions of the jaws 78 and 79 at the centerpiece 84 to be parallel to the sides of such centerpiece, when the jaws are subsequently closed again. If it were not for that feature of the second termination 61 holding the jaws open for passage of the first termination therethrough, the front of the jaws would have to be unduly beveled outwardly and could thus not perform their important stabilizing function on the stabilizing bar 37, presently to be described in greater detail.

In particular, the stabilization bar 37 is slightly thicker than the centerpiece 84, so that the jaws 78 and 79 pinch that stabilizing bar 37 with their corresponding front portions, as if that bar were held by the parallel front portions of the jaws of the familiar kind of pliers which have recesses behind the jaw front portions, while the jaw portions themselves are essentially parallel, when the pliers are closed.

That time-proven principle is used to great advantage in a new form, application and combination by the illustrated preferred embodiment of the subject invention.

In particular, the ramp 84 guides the returning interconnection or tape coupling 25 to the position shown for the first and second tape leader terminations 44 and 61 in dotted outline in FIG. 11, whereby the jaws 78 and 79 close in on and clamp the second termination therebetween, as soon as that advancing second termination 61 has reached the mutually opposed or corresponding indentations or recesses provided therefor in the jaws 78 and 79 ahead of the flat jaw portions, as seen in the direction of rewind tape travel 98. As seen in FIG. 11, each such jaw recess is composed of three surfaces so that each jaw contacts the cylindrical second termination 61 at three points, for optimum positioning in space.

The centerpiece 84 thereby performs the important function of centering the tape interconnection 25 and thereby the projecting prong or pin member 54 so that the tubular first termination 44 will surely register with, and slide over, that projecting pin, when a cartridge 13 is returned to a vacant cassette space 17 after having been removed and absent therefrom.

In particular, if the tape junction 25 should tilt either way between the gripping jaws, then one of the jaws would impinge upon the stabilizing bar 37, while the other jaw would impinge against the centerpiece portion of the ramp 84. This would tension one of the springs 81 and 82 stronger than the other of these springs, and that one tensioned spring would then act through the corresponding clamping arm 76 or 77 and the corresponding jaws 78 and 79 on the stabilizing bar of the coupling member 68, until that bar 37 and thereby the free pin member 54 are laterally aligned with the centerpiece 84 and are at the same time securely clamped between the leading mutually parallel edges of the jaws 78 and 79, as indicated in FIG. 11. By extension, that principle also centers the first tape coupling device 12 or termination 44 between the corresponding jaws of the cartridge trap mechanism presently to be described, and thus cooperates with the clamping arm centering pins 123 and 124, shown in FIG. 14 for centering that coupling device or termination 44 so that it will register with the projecting pin or prong 54 when the cartridge 13 is reinserted into the cassette 14.

According to the illustrated preferred embodiment of the subject invention, most precise centering and mutual registry of the tape junction elements 44 and 54 are thus effected.

It may be noted in this respect that the stabilizing bar 37 is spaced from the pin member 54 at the takeup reel side of that pin member, and that the cassette 14 includes means 78 and 79 near the cartridge space 17 for engaging and releasably retaining that stabilizing bar during insertion of the cartridge 13 into, and during removal of that cartridge from, the cassette.

Even though the spring-biased jaws reliably capture and securely trap the second coupling member 16 or termination 61 therebetween, the slanted inside surfaces of the retention recesses of these jaws oriented in a direction of regular tape forward travel 103, permit the second termination 61 to spread the clamping arms 76 and 77 again apart against the bias of springs 81 and 82, when the takeup reel 15 is rotated so as to advance and wind the tape 10 out of the cartridge 13 and onto the takeup reel hub 41.

While tape and tape leaders generally travel in the direction of arrows 98 and 103 shown in FIG. 11, the trap mechanism frame 74 also has a top slot 105 into which a tape or tape leader may be inserted into the path of tape leader or tape travel 106.

That path 106 extends also through the cartridge-side trap mechanism 110 shown in FIGS. 2 to 6 and 12 to 14.

In particular, what, in terms of tape advance travel, may be viewed as the first trap mechanism 110 is located at an opening 71 of the cartridge 13 and, as for instance seen in FIG. 6, may in effect constitute such a cartridge opening itself. The cassette-side trap mechanism 72 then could be considered the second of two trap mechanisms in the direction of tape advance travel through the path 106 and thence through a VCR to the cassette takeup reel 15.

Figure 14:
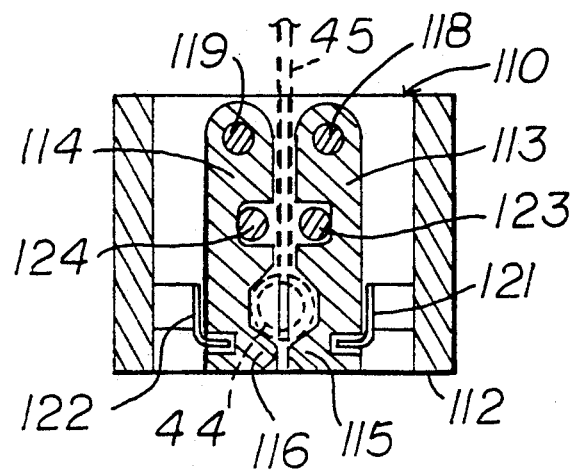
FIG. 14 is a section taken on the line 14—14 in FIG. 13.

In terms of the drawings, FIG. 14 could be placed at the right-hand side of FIG. 11, so as to provide a composite illustration of the cassette-side trap mechanism 72 and the cartridge-contained trap mechanism 110. In that case, the cassette-side coupling device or termination 44 shown in FIG. 11 appears again in FIG. 14, as it does, indeed, in the actual trap mechanism 110, when the tape 10 has been fully loaded or rewound into the cartridge 13.

In similarity to the cassette-side trap mechanism 72, the cartridge-contained trapmechanism 110 in FIG. 14 has a frame 112, clamping arms 113 and 114, with jaws 115 and 116 for gripping the tape termination 44. These clamping arms 113 and 114 are journaled on pivot pins 118 and 119 and are biased inwardly by springs 121 and 122.

In the quiescent position, the spring-biased clamping arms 113 and 114 rest against clamping arm centering pins 123 and 124, respectively, which, in similarity to the centerpiece 84 of the other trap mechanism 72, center the first tape coupling device 12 or tape leader termination 44 in the first trap mechanism 110.

In similarity to the frame 74 of the trap mechanism 72, the frame 112 has a top slot 126 through which a tape or tape leader could be laterally inserted into the tape travel path 106. However, unlike that frame 74, the frame 112 of the trap mechanism 110 has a bottom slot 128 for the accommodation of an end of the horizontal base bar 64 of the coupling member 68 below the projecting pin or prong 54.

Accordingly, when the cassette trap mechanism 72 releasably retains the projecting pin member 54 in the cartridge space 17 of the cassette, then the bottom slot 128 and the bearing or first tape leader termination 44, releasably held between the jaws 115 and 116, receive that projecting pin member or first prong 54 of the tape coupling device 16, when the cartridge 13 is inserted into the space 17 in the cassette 14. The tape leader interconnection 25 shown in FIG. 7 and described above is thereby established, and the tape 10 in the cartridge 13 is connected by the tape leader combination 49 to the takeup reel 15, for an advance of the tape through the VCR or similar apparatus and a winding thereof on the takeup reel hub 41.

The currently discussed aspect of the subject invention thus provides means, such as spring biased jaws 115 and 116 (e.g. FIG. 14) at an opening 71 of the cartridge (see FIG. 6), for releasably trapping the first tape coupling device 12 (e.g. FIG. 2) at that opening 71 preparatory to removal of the cartridge from the space 17, during removal and absence of the cartridge from the cassette 14 and preparatory to insertion of the cartridge into that space in the cassette. Pins 123 and 124 thereby aid in the centering of that first tape coupling device between the jaws 115 and 116, but that centering function may also be aided by the centerpiece 84 of the other trap mechanism 72, as mentioned above with reference to FIGS. 8 to 11.

The cartridge 13 also includes means, such as the above mentioned biased jaws 115 and 116, for releasably retaining the bearing or tape leader termination 44 at the cartridge opening 71, for reception of the pin member or prong 54 in the bearing or tape termination tube or bore during insertion of the cartridge into the space 17 in the cassette 14.

The cassette 14 has a VCR spline drive spindle access hole below the takeup reel hub 41, for reception of a takeup reel spline drive spindle (not shown). In practice, that spline drive spindle is part of standard VCRs and similar tape recording and playback apparatus, and fits into a corresponding spline hole in the hub 41, for rotation of the takeup reel and winding of the tape leaders, their interconnection and the tape 10 on the takeup reel 15. As with practically all modern tape recorders and playback equipment, the actual tape drive is effected by a tape capstan (not shown). Advancement of the tape leaders in the tape advance direction 103 shown in FIG. 11 pulls the bearings or terminations 44 and 61 of the coupling devices 12 and 16 out of the spring-biased jaws 115 and 116 and 78 and 79, respectively, inasmuch as these jaws have internal sides which are slanted in the direction of tape advance at these terminations 44 and 61.

As in the case of jaws 78 and 79, each jaw 115 and 116 has one straight and two slanted internal surfaces by which to contact the corresponding tape termination 44 and to hold the same precisely in place at three points per jaw, until a tape leader advancement spreads such jaws and removes the interconnection 25 out of the trap mechanisms 72 and 110.

That operation is facilitated by the fact that the advancing takeup-side termination 61 holds the arms 76 and 77 and thereby the jaws 78 and 79 apart from each other, for a transport of the advancing cassette-side termination 44 through the takeup-side trap mechanism 72 as well, as may, for instance, be seen from FIGS. 1, 7 and 11.

Since according to the illustrated preferred embodiment of the invention, the jaws are partially held open by the steel tube 61 of the cassette side of the tape junction, the steel tube 44 of the cartridge side of the tape junction is able to get through the jaws in the outgoing direction, even though such jaws are essentially blunt or square-ended because of space limitation and design considerations and would thus block the tube's entry solidly.

To re-emphasize, the major goal of the best mode of carrying the invention into effect is to provide a cassette that, upon loading with the cartridge herein disclosed, can be used in a standard recording and/or playback apparatus designed for a standardized cassette of that type which, in turn, was designed for a specific standardized tape. In other words, even though the cartridge and cassette combination of the subject invention is not standard at this point of time, the best mode for carrying the invention into effect requires that the cartridge and cassette combination look like a standard cassette to, and act like a standard cassette in a standardized recording and/or playback apparatus designed for the standardized tape used in the particular cartridge and cassette combination.

By way of example, if the cartridge and cassette combination, according to a preferred embodiment of the subject invention, is to be used in a particular standard or standardized VCR (video Cassette Recorder) which has been designed and typically will have been purchased without any knowledge of the subject cartridge and cassette combination, then the cartridge and cassette combination according to a preferred embodiment of the subject invention still has to perform in that standard VCR as if it were a standard ordinary video tape cassette.

It also has to look to that standard VCR like an ordinary video tape cassette. In this respect, "look" is more than a mere metaphor, since a VCR, like a good many other recording and playback apparatus, have machine vision, employing photo cells and other electrooptical devices.

Figure 15:
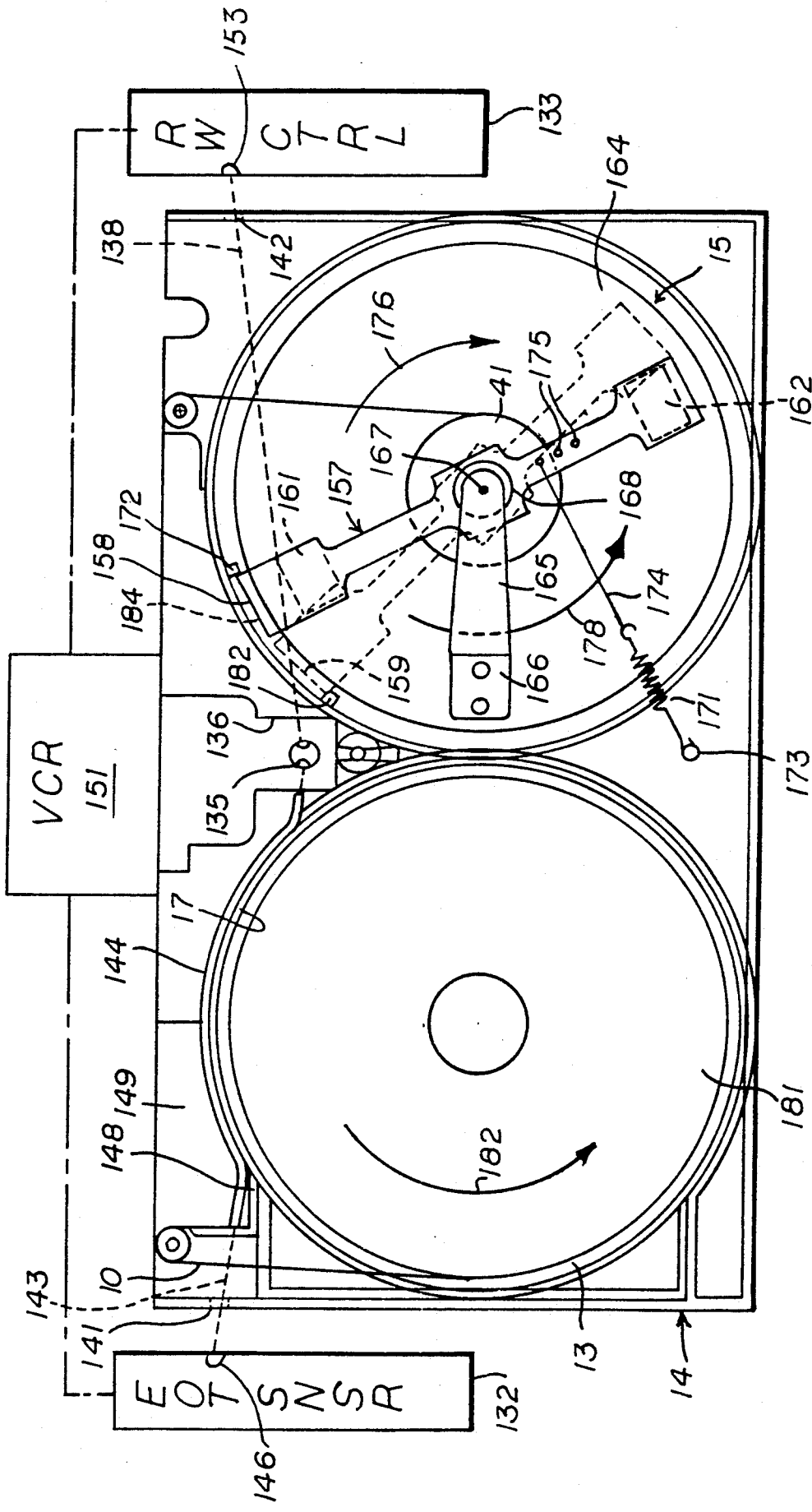
FIG. 15 is a top view of a cassette and cartridge combination of the type shown in FIG. 2, but having tape coupling devices, trap mechanisms and cover parts omitted for a clearer showing of end-of-tape and tape rewind sensors and controls according to preferred embodiments of the subject invention.

By way of example, FIG. 15 shows conventional end-of-tape (EOT) and tape rewind sensors or controls 132 and 133, which may be of a conventional type for controlling various functions of the VCR or playback apparatus, including end-of-tape, clear leader or other tape sensing, and automatic or semi-automatic tape advance for recording, playback or fast forward mode, and automatic or semi-automatic tape rewind.

For the sake of clarity, a showing of the tape coupling devices, interconnection and trap mechanisms has been omitted from the showing of the cassette 14 in FIG. 15. However, those features according to a preferred embodiment of the invention also form part of the cassette shown in FIG. 15, or the features of the cassette shown in FIG. 15 typically form a part of the cassette combination shown in FIGS. 1 to 3.

By way of background and example, a standard VCR has a dual light source 135, seen in FIG. 15, which is mechanically inserted into an aperture 136 of a tape cassette when the cassette is inserted into such VCR. Light-emitting diodes are now typically used for that purpose. Also typically, such diodes are provided with tiny internally mounted lenses to emit infrared or other light along straight paths such as shown for the light beam 138 in FIG. 15. In a standard cassette, such light beams typically go through the supply reel and takeup reel sections inside the cassette, leaving the same through windows 141 and 142 in the lateral cassette walls. But since the supply reel is enclosed in the opaque cartridge case, the light beam could not pass through the case unless it had two holes in it, which would also permit dust and dirt to enter.

However, according to an embodiment of the invention, FIG. 15 shows a novel alternative, according to which the light beam 143 from the VCR light source 135 is guided around the cartridge case by a light guide or pipe 144 from the source 135 toward the cassette window 141 and photo cell 146 of the EOT 132, for sensing the presence of any tape or tape leader in the region traversed by the beam 143. In the embodiment shown in FIG. 15, the light pipe 144 thus guides light from the source 135 to the latter tape or tape leader. Fiber optics might be employed for that purpose, but use of a solid light pipe of Lucite or a similarly clear acrylic material is presently preferred.

The light pipe 144 is curved to extend as part of the internal wall of the cassette 14 around the internal cassette space 17 in which the cartridge 13 is received.

The light pipe 144 need not be circular, but may have a rectangular cross-section. According to a preferred embodiment of this aspect of the invention, the light pipe 144 is provided with such a cross-section that it will fit into and form part of the wall 148 around part of the cartridge or cassette space 17 or around part of the inserted cartridge 13.

This is not only the best structural solution, but also leaves unobstructed the critical space 149 behind the tape 10, through which the familiar tape pull-out fingers come to be inserted during insertion of the cassette into the VCR. Such fingers are well known in the tape cassette art, serving the familiar purpose of pulling the tape 10 out of the front of the cassette and wrapping such pulled-out tape around the rotating head drum in the VCR.

Instead of obscuring the disclosure of the invention with an illustration of such and other well-known parts and components, FIG. 15 merely shows a block 151 labelled VCR, as representative of standardized apparatus designed to receive magnetic tape in a two-reel-type cassette for transducing signals relative to the tape. In this respect, the blocks 132, 133 and 151 also symbolize apparatus wherein tape handling functions are controlled in response to tape sensing operations, such as those already described with respect to the light guide 144 and those presently to be described in conjunction with the light beam 138.

In this respect, the embodiments of the invention shown in FIGS. 15 and 16, and equivalents thereof, automatically disable the tape sensing operation during rewinding of the tape 10 into the cartridge, and automatically enable such tape sensing operation instantly upon completed rewinding of the tape into that cartridge 13.

As shown by way of example in FIG. 15, the rewind control 133 may be provided with a photo cell or photodetector 153 and conventional controls connected thereto for distinguishing between the dark tape on the one hand and a clear leader on the other hand. In this manner, a standard VCR is capable of controlling the tape rewinding process, which typically includes effecting a so-called autostop at tape run-out at the end of rewind.

In standardized apparatus, certain time delays or other safeguards are built in for preventing accidental or unintended operation of the control. Also the tape, as well as any clear leader, is typically structured or arranged in standard cassettes so as to avoid any accidental activation or deactivation of any photosensitive control.

In the instant case, the same kind of objective could be accomplished by making the tape leader 45 etc. appear to be transparent on the way in, and opaque on the way out of the takeup reel region. Tests have shown that because of certain inherent time delays, the tape junction 68 is not itself a problem at this point, even if it is covered over or shielded by an opaque material, in order to prevent occurrence of problems in the region of the other beam 143 at the end-of-tape sensing position. For instance, possible problems from light of the beam 143 shining through substantial gaps between the stabilizing member 37 and the tubular members 44 and 61 may be avoided by attaching thin strips of an opaque material, such as black Mylar tape, to sides of the stabilizing bar 37, as indicated by dotted outline 155 in FIG. 7. In this or any similar manner, substantial penetrations of light, which could interfere with VCR operation, are effectively blocked.

The interconnection 68 is thus rendered discernible by the tape sensing operation, either by design or by such measures as an opaque region 155, to aid an end-of-tape sensing operation during automatic REWIND of the VCR.

The preferred embodiments of the invention shown in FIGS. 15 and 16 provide a disabling member, such as a blind 184, having a quiescent position 158 and an alternative active position 159 for disabling the tape sensing operation normally effected at 153.

The disabling member is advanced to the active position 159 in response to rewinding of the tape 10 to the cartridge 13. By way of example, frictional forces or forces of acceleration may be employed for advancing the disabling member to its active position 159. For instance, the arm 157 may be equipped on an underside thereof with felt or other frictional pads 161 and 162 which are urged against the upper flange 164 of the takeup reel 15 by a hold-down spring 165, riveted or otherwise attached to the upper side 22 of the cassette at 166. In this respect, the upper sides of the cassette and the cartridge are considered to be perfectly transparent for the purpose of FIGS. 15 and 16, so that all relevant parts shown therein may be seen clearly from the top of the drawing.

The upper flange of the takeup reel 15 at its center has a pivot 167 for rotational movement of the arm 157 relative to its own axis of rotation. A pivot bearing is seen at 168. The downward force of spring 166 (FIG. 15) in the cartridge cassette serves two functions: it maintains the pivot bearing 168 of the double-bladed arm 157 in engagement with the pivot pin in the top center of the takeup reel 15 and it provides the downward force on the two felt pads 161 and 162 which gives them the necessary frictional force to pull them around rotationally when the takeup reel is rotating in the counterclockwise direction.

When the cassette 14 is inserted into the VCR, the conventional takeup reel drive shaft or spline enters the cassette through an aperture from the underside thereof, urging the takeup reel 15 upwardly and thereby its upper flange 164 into engagement with the friction pads 161 and 162.

A spring 171 urges the disabling member or arm 157 against a stop 172, whereby the disabling member is releasably retained in its quiescent position. The spring 171 may be anchored at one end thereof to the cassette. For instance, an anchoring pin 173 attached to the cassette floor may be employed for that purpose. A spring connecting rod 174 connects the movable arm 157 to the other end of the spring 171. FIG. 15 shows several apertures 175 in the arm 157, whereby the spring force is rendered adjustable by engagement of the arm by the spring connecting rod 174 at various radially different positions.

According to a further embodiment of the invention, the force of gravity may be employed instead of a downward spring force to give the necessary frictional force required at the felt pads 161 and 162 to make the arm 157 rotate from its quiescent position 158 to its active, light-blocking position 159.

As long as the takeup reel 15 stands still or rotates in the direction of arrow 176, the disabling member remains in its rest position against the stops 172 and 191. Accordingly, the light beam 138 is not obscured by the blade or blind 184 when the takeup reel 15 is rotated to wind tape onto its hub 41.

On the other hand, when the conventional Rewind button of the VCR 151 is depressed, the conventional tape supply drive shaft or spline drives the supply reel 181 in the cartridge 13 in the counterclockwise sense 182, thereby pulling tape from the takeup reel 15 or takeup reel hub 41 to the cartridge 13. As a result, the takeup reel 15 is also rotated in a counterclockwise direction 178.

Such counterclockwise rotation is in effect transmitted to the arm 157 via friction pads 161 and 162, whereby that arm moves angularly from its rest stop 172 to the the stop 182 of its active position. The disabling member thus is moved to its active position in response to rewinding of the tape 10 into the cartridge 13. The particular disabling member actually is a blade 184 which depends from a free end of the arm 157 and runs downwardly so as to obstruct the light beam 138 when the arm 157 is advanced from its rest position at the first stop 172 to its advanced position at the second stop 182. In other words, the disabling member 184 obscures the beam 138 in its active position 159.

In consequence, the photo detector 153 cannot see any clear tape leader as long as the counterclockwise rotation 178 of the takeup reel 15 continues. In this manner, even a transparent tape junction or leader can in effect be rendered opaque, as far as the detector 153 of the rewind control can see, while that same detector would see again a transparent leader when the rewinding of the tape has been concluded.

In particular, the takeup reel 15 stops rotating, when there is no more tape to be pulled from its hub 41. In that case, the spring 171 or another return force automatically enables the tape sensing operation at 153 by returning the disabling member 184 to its quiescent position 158 in response to completed rewinding of the tape 10 into the cartridge 13.

By way of illustrated example, it may be seen that the disabling member 184 is advanced to, and is retained in, its active position 159 by viscous friction between the disabling member and the takeup reel during rewinding of the tape. According to FIG. 15, such viscous or dynamic friction takes place between the upper surface of the takeup reel flange 164 and friction pads 161 and 162 at the arm 157 which is moved and retained thereby. In practice, that viscous friction creates a force countering the bias of the spring 171.

On the other hand, the bias spring 171 is capable of returning the disabling member 184 against static or Coulomb friction relative to the takeup reel 15 or flange 164 to the quiescent position 158, when the takeup reel stops rotating, such as when the tape breaks or when its rewinding into the cartridge 13 has been completed. In that case, the light beam 138 is unobstructed and the control 133 can perform its normal function.

In practice, return of the disabling member 184 or arm 157 also may take place against a low level of dynamic or viscous friction, such as where there still is an air or fluid film between the pads 161 and 162 and reel flange 164 from the rotation in the direction of arrow 178, when that rotation stops.

The light-blocking arm 157 of the embodiment of the invention shown in FIGS. 16 and 17 rests with its felt or other friction pad 161 by force of gravity alone on the upper flange 164 of the takeup reel 15. The above mentioned first stop 172 is in the form of an arm guiding pin, and the second arm guiding pin is seen at 191. The second stop 182 is formed by a first slot in the arm at the first guiding pin or stop 172, and that arm 157 also has a second slot 192 at the second guiding pin 191.

The mechanism shown in FIGS. 16 and 17 also has a blade or blind 184 for automatically disabling the tape sensing operation during rewinding of the tape into the cartridge 13, and for automatically enabling that tape sensing operation upon completed rewinding of the tape into the cartridge, like the mechanism of FIG. 15. Accordingly, reference may be had to the above description of FIG. 15 for the functioning of the remaining parts of the control mechanism shown in FIGS. 16 and 17. Also, the remainder of the cartridge-cassette, including the part broken away in FIG. 16, may be the same as in FIG. 15.

The embodiments of FIGS. 15 to 17 advance the light-blocking member 184 with a force equal to the product of the co-efficient of friction at 161 and 162 and the force normal to the takeup reel flange 164 ($f = \mu N$). However, embodiments wherein the force of activating the disabling or light-blocking member is equal to mass times acceleration ($f = ma$) are also within the contemplation of the subject invention. To name just one example in this respect, the friction pad 161 in FIGS. 16 and 17 could be replaced by soft bristles engaging radial ribs on the upper takeup reel flange 164. When the reel rotates in the clockwise direction 176 during tape winding or normal tape advance operation, the latter ribs merely rub against the bristles on the arm 157, since the spring 171 already holds that arm in its rest position.

However, during tape rewind in the direction 178 the ribs urge the bristles and thereby the arm 157 toward the light beam 138 with a force proportional to the speed with which the ribs are hitting the bristles. In the rewind mode, that force is sufficiently high to overcome the bias of the spring 171 and to cause the blind 184 to obstruct that light beam as described above, until the reel 15 comes to a stop at the end of the tape rewinding operation. At that point of operation, the force at the latter bristles drops to zero, and the spring 171 returns the arm 157 and blind 184 to their rest position, against the bristles brushing over the now stationary radial ribs on the reel flange 164.

Figure 18:
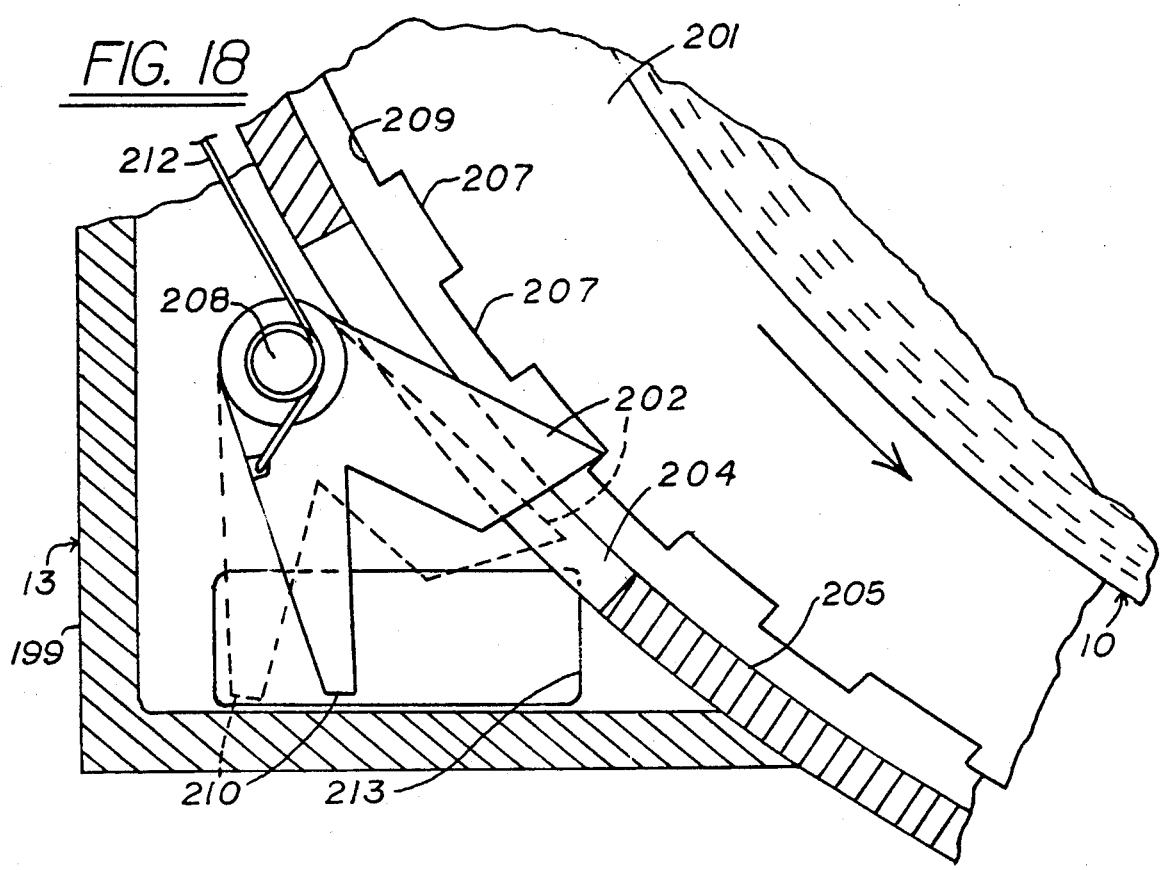
FIG. 18 is a top view, on an enlarged scale, of a tape supply reel locking mechanism according to a preferred embodiment of the invention, as seen after removal of a cover at the cartridge corner designated by the phantom arrow in FIG. 2.
Figure 19:
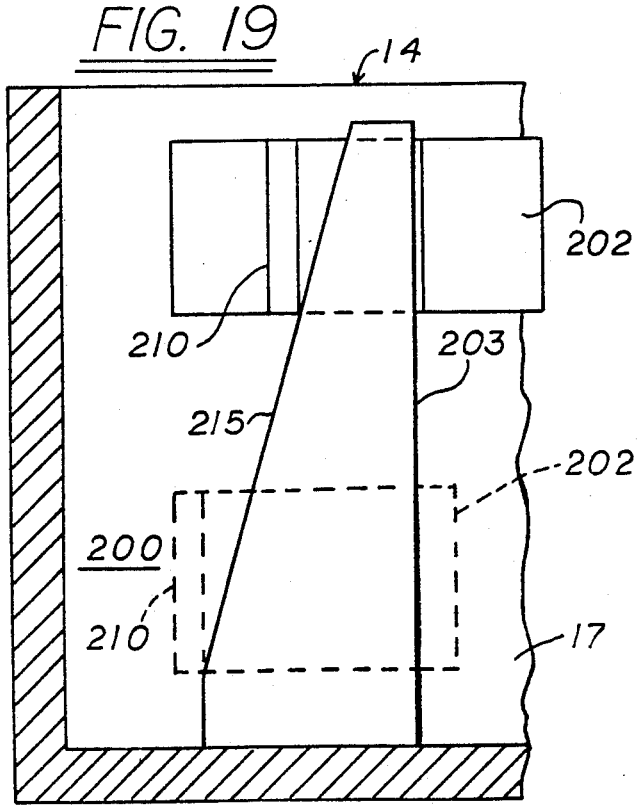
FIG. 19 is a section taken on the line 19—19 in FIG. 1, as well as an elevation of a tape locking mechanism part shown in top view in FIG. 18, to indicate an interlinking relationship of the cartridge and cassette according to an embodiment of the subject invention.

FIGS. 18 and 19 show fractional top and side views, respectively, of the corner, of the cartridge 13 and cassette 14, as approximately indicated by the phantom arrow 18 in FIG. 2 and phantom line 19—19 in FIG. 1. The cartridge cover has been removed from the corner 199 to show a tape locking mechanism in its relation to adjacent parts of the cartridge tape reel or reel flange 201.

That cartridge corner 199 fits into the cassette corner 200 when the cartridge 13 is inserted into the cassette space 17.

The specific purpose of the mechanism shown in FIG. 18 is to lock the tape 10 in the cartridge so that the loaded tape cannot unravel from the cartridge when the cartridge is removed from the cassette and while the cartridge is handled or stored apart from the cassette.

The cassette 14 is designed for enabling locking of the tape into the cartridge upon removal of that cartridge 13 from the cassette and, conversely, for disabling the tape locking mechanism upon insertion of the cartridge into that cassette 14.

According to the specific embodiment of FIG. 18, the cartridge 13 includes a selectively actuable pawl 202 for locking the tape 10 in the cartridge, and the cassette 14 includes a tapered peg or spike 203 for enabling the pawl 202 (that is, the means for locking the tape into the cartridge) to lock that tape 10 into the cartridge upon removal of that cartridge 13 from the cassette and for disabling that tape locking means or pawl 202 upon insertion of the cartridge into the cassette 14 or cassette space 17.

The pawl 202 extends through a lateral opening 204 in the round part 205 of the cartridge case, adjacent the square part or corner 199. The bottom flange 201 of the tape feed reel in the cartridge 13 has circumferentially distributed notches 207 for engagement by the pawl 202. An upright pin 208, rising from the bottom of the cartridge 13, pivots the pawl for movement relative to the notched edge 209 on the bottom flange 201 of the tape supply or feed reel in the cartridge 13.

The pawl has its own actuating lever arm 210 integral therewith. A pawl actuating spring 212 biases the pawl to its active position into engagement with the tape supply reel flange 201 at one of the notches 207. Sufficient play is provided in this respect to accommodate any tolerance of the tape supply reel from a dead center position. In this manner, the pawl 202 is able to follow lateral deviations of the tape supply reel from what may be considered dead center. For instance, when the cassette 14 with inserted cartridge 13 is removed from the VCR then the tape supply and takeup reels leave the drive sprockets or splines and are thereby free to move somewhat in the cartridge or cassette, respectively. The pawl mechanism has enough lateral play to accommodate all such motions and to lock the tape supply reel securely in the cartridge upon manual removal of that cartridge 13 from the space 17 in the cassette 14, and to maintain that tape supply reel locked until the cartridge is reinserted into a cassette.

The cartridge casing has an opening 213 in the bottom of the corner 199 for reception of the spike 203 projecting from the bottom of the cassette 14 as shown in FIG. 19.

When the cartridge 13 is inserted into the space 17 in the cassette 14, then the actuating lever arm 210 engages the sloping front 215 of the spike 203. FIG. 19 shows in solid outline the reel locking pawl 202 with its integral actuator 210 at a typical position when the cartridge 13 has been inserted for only a fraction of its possible downward travel into the cassette 14. At that point, the pawl 202 is still capable of locking the tape supply reel in the cartridge by engagement of one of the notches 207. To avoid overcrowding and loss of clarity, FIG. 19 only shows the pawl 202 and its integral actuator 210 without showing any of the other parts of the locking mechanism and of the cartridge.

As apparent from the dotted outline of the pawl 202 and actuator 210, the sloping front or edge 215 of the spike 203 pulls the pawl out of engagement with the notched supply reel edge 209 as the cartridge 13 is pushed downwardly into its space 17 in the cassette 14. The cassette spike 203 thus disables the tape locking pawl 202 upon insertion of the cartridge into the cassette. Such disablement is illustrated in FIGS. 18 and 19 by dotted representations of the pawl 202 with integral actuator 210, showing the retracted pawl 202 well out of reach of the feed reel edge 209.

Conversely, when the cartridge 13 is removed from the cassette 14, the cassette reel locking function of the pawl 202 is automatically enabled or resumed. By way of example, if the pawl assembly moves upwardly from its dotted to its solidly illustrated position shown in FIG. 19, then the pawl actuator 210 can slide along the slope 215 against which it is pressed by the bias spring 212 in the cartridge 13. Accordingly, the pawl 202 moves from its disengaged or inactive position, shown in dotted outline, to its solidly illustrated enabled or active position, for resuming its supply reel locking function.

Figure 20:
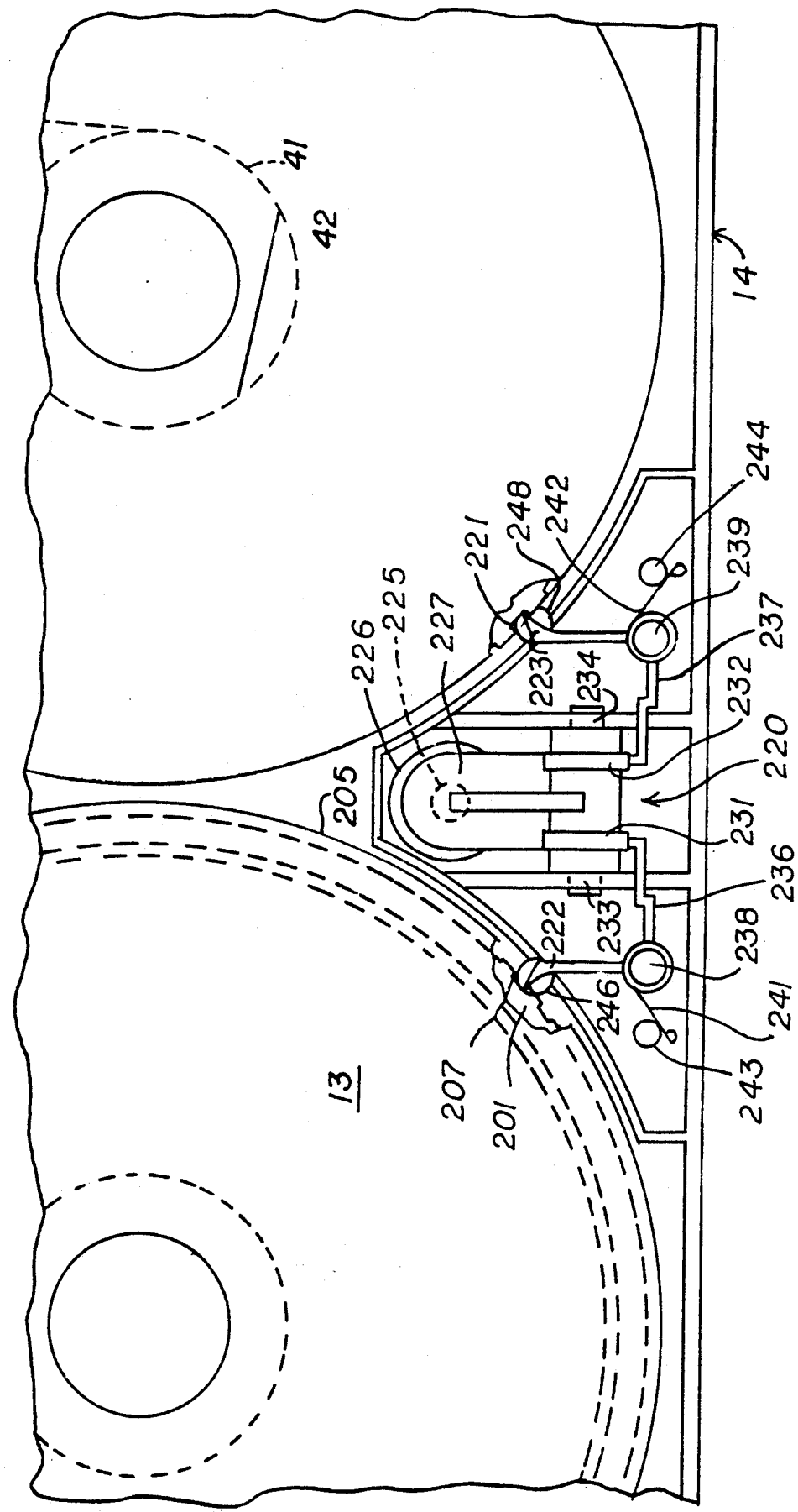
FIG. 20 is a detail view, on an enlarged scale, of part of the cassette and inserted cartridge, and with a cover removed to show a top view of a cartridge-cassette tape locking mechanism modified according to an embodiment of the subject invention.

It should be recognized at this point that insertion of the cartridge 13 into the cassette 14 with resultant relocation of the pawl 202 to its retracted or inactive position shown in dotted outline, does not necessarily mean that the tape supply reel is then free to move. Rather, there may be other means for retaining the tape supply and takeup reel, and thereby the tape located thereon against movement. For instance, modern tape cassettes, especially those used in VCR's, have locking means which retain the tape and tape reels in place until the cassette has been inserted into the VCR. These cassette tape locking means are shown in FIG. 20.

In this respect, the same notched edge 209 as shown in FIG. 18 may be employed for operation with cassette-side tape locking means 220 and the takeup reel 15 may be provided with a similar notched edge 221, in accordance with conventional practice. As is well known, a typical example of such conventional practice provides a pair of pawls 222 and 223 for engaging notched edges 209 and 221 of the supply and takeup reels, respectively, when the cassette 14 is removed from the VCR. The pawl actuator shown at 225 may be a steel pin mounted on the base of the VCR and projecting through an access hole 226 in the base of the cassette for actuating a central pivoting lever 227 when the cassette 14 is inserted into the VCR. Such actuating motion of the lever 227 is translated via vertical bars or cams 231 and 232, pivoted at 233 and 234, and pawl actuators 236 and 237 to the pawls 222 and 223, pivoted at 238 and 239, respectively. When and while the cassette 14 is removed from the VCR, latching pawl springs 241 and 242, bearing against posts 243 and 244, establish and maintain engagement of the pawls 222 and 223 with the tape supply and takeup reel edges 209 and 221, whereby the tape may not unravel from the cartridge-cassette assembly. On the other hand, the VCR pin 225 withdraws the pawls 222 and 223 from their locking positions for movement of the tape in the VCR, when the cartridge-cassette assembly 13, 14 is inserted into the VCR.

Shallow pockets 246 and 248 in the floor of the cassette insure engagement of the pawls 222 and 223 with the bottom flanges of the feed and takeup reels, when the cassette is outside of the VCR, because at that time the reels are flat down on the bottom of the cassette floor.

The pawl 222 is structured so as to enter the cartridge and perform its tape locking function on the supply reel flange 209. For instance, the presence of the cartridge with its casing 205 and notched reel flange edge 209 spaced inwardly therefrom, requires a sloping top surface or other modification of the conventional pawl provided for supply reel locking purposes in the cassette.

In the illustrated embodiment of the invention, the supply and takeup reel locking mechanism shown in FIG. 20 is in addition to the supply reel locking mechanism shown in FIGS. 18 and 19. It is conceivable that the tape lock disabling pin or spike 225 conventionally present in typical VCR's may be employed to disable the locking pawl 202 (FIG. 18) in the cartridge as well, thereby saving one of the conventional locking pawls in the cassette 14. However the best mode presently contemplated for carrying the invention into effect avoids any redesign of any part of the conventional VCR or other apparatus in which the cartridge-cassette of the subject invention is employed. Actually, that best mode prefers that there be a separate means, such as the spike 203, permanently in the cassette for selectively disabling the cartridge reel lock or locking pawl 202, in addition to whatever corresponding spike there may be permanently provided in the VCR for selectively disabling conventional tape locking means.

While specific aspects of FIGS. 18 and 19 deal with a locking of the loaded tape 10 in the removed cartridge 13, these drawings also illustrate broader aspects of the invention.

For instance, the spike 203, being part of the cassette 14, and the actuator 210, being part of the cartridge 13, and their mutual operation illustrated by solid and dotted outlines in FIGS. 18 and 19, connote any releasable interlinking of the cartridge and the cassette upon insertion of that loaded cartridge 13 into cassette 14. They also connote a selective enabling and disabling of a function of the cartridge in the cassette in response to that interlinking and to a release thereof. It may be seen in this respect that the embodiment of FIGS. 18 and 19 and its broader connotations within the scope of the subject invention establish a mutual relationship between the releasable cartridge-cassette interlink and the operation of the tape 10 relative to the cartridge 13. For instance, the illustrated pawl 202 is representative of means coupled to the cartridge-cassette interlink for a mutual control of that releasable interlink and an operation of the tape relative to the cartridge. Within the scope of the invention, that control need not necessarily run from the interlink to the tape 10. Rather, the expression "mutual control" is intended to indicate also that the control could run from the tape, so to speak, to the interlink.

By way of example, the interlink within the scope of the subject invention may be a means for retaining the cartridge 13 in its space 17 in the cassette 14, until the tape has been completely rewound into the cartridge, at which point the cassette-cartridge interlink is released or is manually releasable, thereby enabling manual removal of the cartridge 13 from the cassette 14. Once that further aspect of the invention has been understood, it may be implemented in various ways.

By way of implementation of that aspect of the invention, the presence of the tape interconnection 25 at the 0—0 position shown in FIG. 2 could be sensed, and the cartridge 13 could then be released from its latter interlink with the cassette 14, for a removal of the cartridge from the cassette.

The subject extensive disclosure will suggest or render apparent to those skilled in the art various modifications and variations within the spirit and scope of the invention and equivalents thereof.

I claim:

1. A magnetic tape cartridge adapted for use in a magnetic tape cassette in lieu of a tape supply reel, said cassette also having space into which the cartridge may be inserted and from which it may be removed, and a takeup reel for use of said cassette, after reception of said cartridge in said space, in apparatus designed to receive magnetic tape in a two-reel-type cassette for transducing magnetic signals relative thereto, said cassette containing a tape coupling device connected to said takeup reel and having a pin member at said space, the improvement comprising in combination:

a single reel for magnetic tape in said cartridge;
on said single reel in said cartridge; and
means for interconnection of said magnetic tape from said cartridge via said tape coupling device to said takeup reel upon insertion of said cartridge loaded with said magnetic tape into said cassette in lieu of a tape supply reel, including a tubular tape coupling member having a bore adapted to releasably receive said pin member and having a tubular wall encompassing said bore.

2. A cartridge as claimed in claim 1, including:
means at an opening of said cartridge for releasably trapping said tubular tape coupling member at said opening preparatory to removal of said cartridge from said cassette, during removal and absence of said cartridge from said cassette and preparatory to insertion of said cartridge into said cassette.

3. A cartridge as claimed in claim 1, including spring-biased jaws at an opening of said cartridge for releasably trapping said tubular tape coupling member at said opening preparatory to removal of said cartridge from said cassette, during removal and absence of said cartridge from said cassette and preparatory to insertion of said cartridge into said cassette.

4. A cartridge as claimed in claim 3, including:
means for positioning said tubular tape coupling member between said jaws.

5. A cartridge as claimed in claim 3, including:
means for centering said tubular tape coupling member between said jaws.

6. A cartridge as claimed in claim 1, wherein:
said means for interconnection of said magnetic tape include a tape leader connected to said magnetic tape and loaded into said cartridge.

7. A cartridge as claimed in claim 1, including:
means for releasably interlinking said cartridge and said cassette upon insertion of said cartridge into said cassette.

8. A cartridge as claimed in claim 7, including:
means at an opening of said cartridge for releasably trapping said tubular tape coupling member at said opening preparatory to removal of said cartridge from said cassette, during removal and absence of said cartridge from said cassette and preparatory to insertion of said cartridge into said cassette.

9. A cartridge as claimed in claim 7, including spring-biased jaws at an opening of said cartridge for releasably trapping said tubular tape coupling member at said opening preparatory to removal of said cartridge from said cassette, during removal and absence of said cartridge from said cassette and preparatory to insertion of said cartridge into said cassette.

10. A cartridge as claimed in claim 1, including:
means for releasably interlinking said cartridge and said cassette upon insertion of said cartridge into said cassette; and
means coupled to said interlinking means for selectively enabling and disabling a function of said cartridge in said cassette in response to said interlinking and to a release thereof.

11. A cartridge as claimed in claim 10, including:
means at an opening of said cartridge for releasably trapping said tubular tape coupling member at said opening preparatory to removal of said cartridge from said cassette, during removal and absence of said cartridge from said cassette and preparatory to insertion of said cartridge into said cassette.

12. A cartridge as claimed in claim 10, including spring-biased jaws at an opening of said cartridge for releasably trapping said tubular tape coupling member at said opening preparatory to removal of said cartridge from said cassette, during removal and absence of said cartridge from said cassette and preparatory to insertion of said cartridge into said cassette.

13. A cartridge as claimed in claim 1, including:
means for releasably interlinking said cartridge and said cassette; and
means coupled to said interlinking means for a mutual control of said releasable interlink and an operation of said tape relative to the cartridge.

14. A cartridge as claimed in claim 1, including:
means for locking the tape in the cartridge upon removal of the cartridge from the cassette.

15. A cartridge as claimed in claim 14, including:
means at an opening of said cartridge for releasably trapping said tubular tape coupling member at said opening preparatory to removal of said cartridge from said cassette, during removal and absence of said cartridge from said cassette and preparatory to insertion of said cartridge into said cassette.

16. A cartridge as claimed in claim 14, including spring-biased jaws at an opening of said cartridge for releasably trapping said tubular tape coupling member at said opening preparatory to removal of said cartridge from said cassette, during removal and absence of said cartridge from said cassette and preparatory to insertion of said cartridge into said cassette.

17. A cartridge as claimed in claim 1, wherein:
said cartridge includes selectively actuable means for locking the tape in the cartridge; and
said cassette includes means for disabling said tape locking means upon insertion of the cartridge into the cassette.

18. A cartridge as claimed in claim 17, including:
means for enabling said means for locking the tape in the cartridge upon removal of the cartridge from the cassette.

19. A cartridge as claimed in claim 1, including:
means for releasably locking the tape in the cartridge upon insertion of the cartridge in said space, including means for receiving a pawl in said cartridge for performance of a tape locking function.

20. A cartridge as claimed in claim 19, including:
means at an opening of said cartridge for releasably trapping said tubular tape coupling member at said opening preparatory to removal of said cartridge from said cassette, during removal and absence of said cartridge from said cassette and preparatory to insertion of said cartridge into said cassette.

* * * * *

UNITED STATES PATENT AND TRADEMARK OFFICE
CERTIFICATE OF CORRECTION

PATENT NO. : 5,021,903
DATED : June 4, 1991
INVENTOR(S) : Warren D. Novak

It is certified that error appears in the above-identified patent and that said Letters Patent is hereby corrected as shown below:

Column 2, line 28, after "issued" insert --December 10, 1985, for Miniature Type Tape Cassette and--;

Column 4, line 30, after "means" insert --for--;

Column 4, line 33, after "reel" insert a comma (,);

Column 5, line 10, change "DESCRIpTION" to --DESCRIPTION--;

Column 5, line 65, after "arrow" insert --18--;

Column 9, line 4, change "need" to --needs--;

Column 10, line 1, change "de Vice" to --device--;

Column 13, line 46, change "trapmechanism" to --trap mechanism--;

Column 14, line 40, after "interconnection" insert --25--;

Column 15, line 17, after "in" insert a comma (,);

Column 15, line 24, change "video" to --Video--; and

UNITED STATES PATENT AND TRADEMARK OFFICE
CERTIFICATE OF CORRECTION

PATENT NO. : 5,021,903

DATED : June 4, 1991

INVENTOR(S) : Warren D. Novak

Page 2 of 2

It is certified that error appears in the above-indentified patent and that said Letters Patent is hereby corrected as shown below:

Column 23, line 20, claim 1, before "on" insert --magnetic tape--.

Signed and Sealed this

Nineteenth Day of October, 1993

Attest:

BRUCE LEHMAN

*Attesting Officer*   *Commissioner of Patents and Trademarks*